United States Patent
Minowa et al.

(10) Patent No.: US 7,156,304 B2
(45) Date of Patent: Jan. 2, 2007

(54) POS SYSTEM, NETWORK SYSTEM, METHOD OF GENERATING PRINTING DATA FOR POS SYSTEM, AND METHOD OF MANAGING SALES AND ADVERTISEMENT INFORMATION IN NETWORK SYSTEM

(75) Inventors: Masahiro Minowa, Nagano (JP); Toshiro Horikawa, Nagano (JP); Kazuyuki Yokoyama, Nagano (JP); Tsutomu Nobutani, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/178,198

(22) Filed: Jul. 8, 2005

(65) Prior Publication Data

US 2005/0247781 A1 Nov. 10, 2005

Related U.S. Application Data

(62) Division of application No. 10/457,794, filed on Jun. 9, 2003, now Pat. No. 7,014,110.

(30) Foreign Application Priority Data

Jun. 10, 2002 (JP) ............................. 2002-168917
Jun. 10, 2002 (JP) ............................. 2002-168918

(51) Int. Cl.
*G06K 15/00* (2006.01)
(52) U.S. Cl. ...................... 235/383; 235/375; 235/380; 705/14
(58) Field of Classification Search ................ 235/383, 235/476; 705/27
See application file for complete search history.

(56) References Cited

U.S. PATENT DOCUMENTS

| 5,923,016 | A | 7/1999 | Fredregill et al. |
|---|---|---|---|
| 6,401,074 | B1 | 6/2002 | Sleeper |
| 6,539,363 | B1* | 3/2003 | Allgeier et al. ............... 705/39 |
| 6,776,345 | B1 | 8/2004 | Liang |
| 2001/0032266 | A1 | 10/2001 | Minowa |
| 2002/0113120 | A1 | 8/2002 | Yajima |
| 2002/0138557 | A1 | 9/2002 | Mukaiyama et al. |
| 2002/0159090 | A1 | 10/2002 | Nobutani et al. |
| 2002/0161830 | A1 | 10/2002 | Mukaiyama et al. |
| 2002/0161831 | A1 | 10/2002 | Nakaoka et al. |
| 2002/0186408 | A1 | 12/2002 | Nakaoka et al. |
| 2003/0036979 | A1 | 2/2003 | Tokorotani |

(Continued)

FOREIGN PATENT DOCUMENTS

EP 1035527 10/2000

(Continued)

OTHER PUBLICATIONS

European Search Report from corresponding EP patent application No. 03012849.0-0-2221-, no date.

*Primary Examiner*—Seung Ho Lee
(74) *Attorney, Agent, or Firm*—Harness, Dickey & Pierce, P.L.C.

(57) ABSTRACT

A POS system is made up of: a POS terminal having a printing apparatus for printing on a receipt based on printing data, and a terminal apparatus for obtaining input information inputted by a user and for generating receipt printing information; a POS server connected to the POS terminal through a network, for controlling the POS terminal; a memory card for providing advertising information; and printing data generating part for generating printing data by adding the advertising information provided by the memory card to the receipt printing information obtained by the terminal apparatus. The printing data generating part is constituted by an additional apparatus connectable to the printing apparatus.

7 Claims, 16 Drawing Sheets

U.S. PATENT DOCUMENTS

2004/0120002 A1    6/2004    Brooks et al.

FOREIGN PATENT DOCUMENTS

| | | |
|---|---|---|
| EP | 1139316 | 3/2001 |
| EP | 1211081 | 11/2001 |
| JP | 2002-056288 | 2/2002 |
| JP | 2002-307765 | 10/2002 |
| WO | WO 01/01669 | 6/2000 |

* cited by examiner

F I G. 10
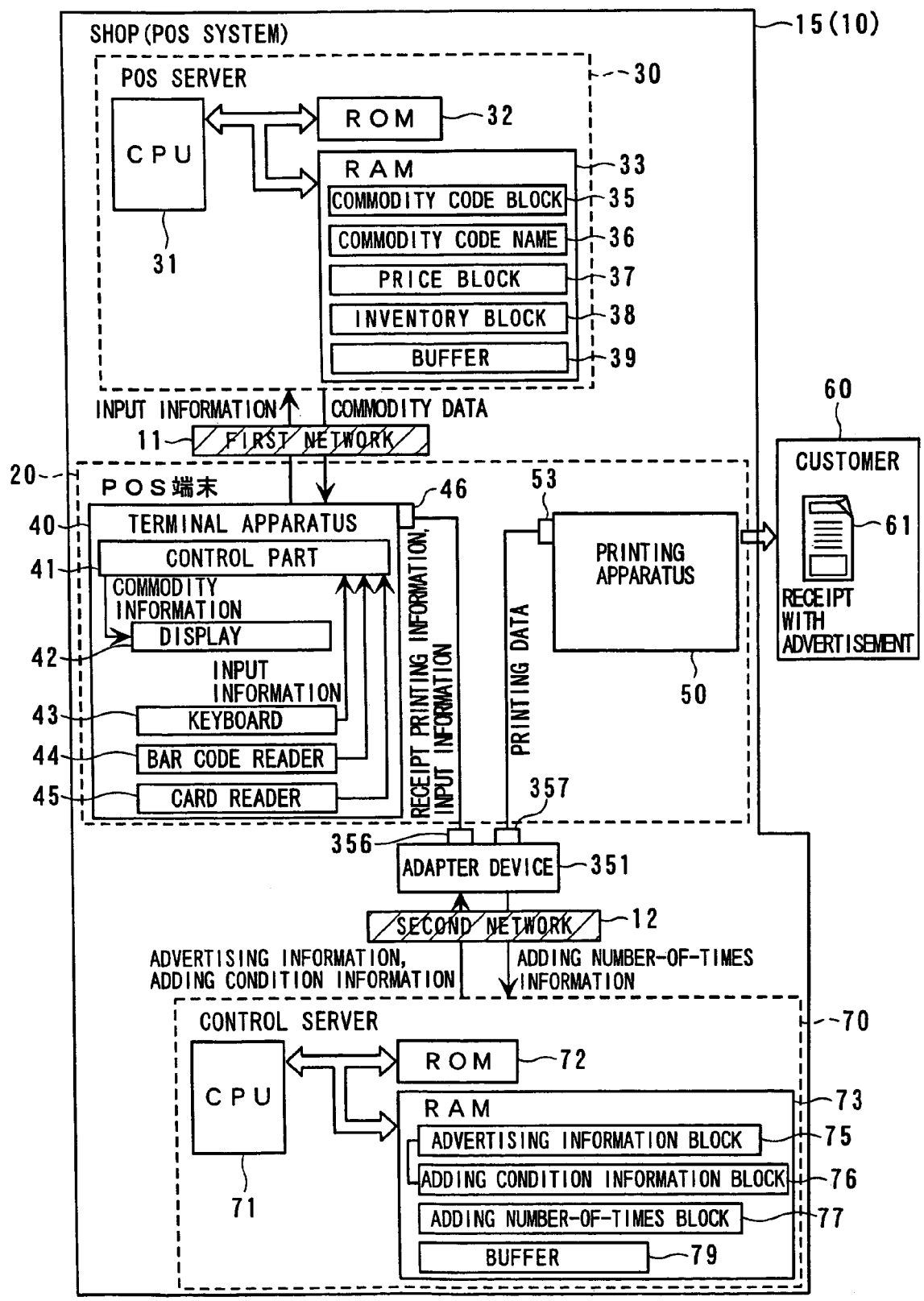

POS SYSTEM, NETWORK SYSTEM, METHOD OF GENERATING PRINTING DATA FOR POS SYSTEM, AND METHOD OF MANAGING SALES AND ADVERTISEMENT INFORMATION IN NETWORK SYSTEM

RELATED APPLICATIONS

This is a divisional patent application of U.S. Ser. No. 10/457,794 filed Jun. 9, 2003 is now a U.S. Pat. No. 7,014,110, which claims priority to Japanese Patent Application Nos. 2002-168917 filed Jun. 10, 2002 and 2002-168918 filed Jun. 10, 2002, all of which are hereby incorporated by reference.

BACKGROUND OF THE INVENTION

1. Field of the Invention

This invention relates to a point-of-sale (POS) system equipped with a POS terminal having a printing apparatus for printing on a receipt based on printing data, and with a POS server to control the POS terminal. This invention further relates to a network system, a method of generating printing data for a POS system, and a method of managing sales and advertisement information in a network system.

2. Description of Related Art

In a conventional POS system which is used for point-of-sale information control in a retail business such as a supermarket, a convenience store, or the like, the following POS terminal is widely used. The POS terminal in question is equipped with a printing apparatus which is capable of printing the so-called commodity information about the purchased commodity name and its price on a receipt after adding thereto advertising information such as commodity (or goods) advertisement, an announcement about an event which is scheduled to take place in the future, or the like. Recently, there are also cases where, aside from the advertising information, the information as a coupon ticket or a lottery ticket is added, whereby the POS system has become an effective advertising means for promoting the sales.

However, this kind of POS system is ordinarily connected to a POS server which performs general controlling over a plurality of terminals. Inputted pieces of information which are inputted, e.g., by scanning bar codes attached to the commodities are transmitted to the POS server. Based on these inputted pieces of information, the POS server generates commodity data inclusive of the prices of the commodities, or the like, and transmits them to the POS terminal. The POS terminal then adds the advertising information to the commodity data transmitted from the POS server to thereby generate the printing data. The printing data are then printed on the receipt by a printing apparatus which is disposed in the system. The printed receipt is then handed over by an operator to a customer, whereby the advertising information is transmitted to the customer.

In the case where a function to add the advertising information is installed to an existing POS system, i.e., the exiting POS system which can issue only the receipt containing thereon the information of the purchased commodities, such as commodity names and the prices thereof, the exiting POS servers and the POS terminals must be subjected to large-scale modifications, requiring a large amount of investment. It is to be noted that many retail sellers are thus obliged to give up the utilization of such a function despite the fact that the POS system provided with such a function becomes a very efficient advertising means.

SUMMARY OF THE INVENTION

This invention has an advantage of providing a POS system having a function of adding the advertising information, as well as an interface unit, an adapter device, a network system, a method of generating printing data for a POS system, and a method of managing sales and advertisement information in a network system, with a minimum of investment without the necessity of large-scale modifications to the existing system.

According to one aspect of this invention, there is provided a POS system comprising: a POS terminal having a printing apparatus for printing on a receipt according to printing data, and a terminal apparatus for obtaining input information inputted by a user and for generating receipt printing information; a POS server connected to the POS terminal through a network, for controlling the POS terminal; advertising information providing means for providing advertising information; and printing data generating means for generating printing data by adding the advertising information to the receipt printing information obtained by the terminal apparatus, wherein the printing data generating means is constituted by an additional apparatus connectable to the printing apparatus.

According to this arrangement, the printing data are generated by the additional apparatus capable of being connected to the printing apparatus. Therefore, without taking the trouble and expenses of largely modifying an existing POS server or a terminal apparatus, it becomes possible to establish the POS system in which the advertising information can be added.

Here, the term "advertising information" refers to those pieces of information which are other than the ones originally intended to be printed on the receipts to be generated based on the input information as inputted by the user. Namely, the "advertising information" refers to advertising information for advertising a commodity (or goods for sale) or announcing an event, or the like, as well as the information in the form of coupons, lottery tickets, or the like. In concrete, this term "advertising information" includes not only the receipts to be issued by retail sellers, or the like, but also slips to be issued by kiosk terminals, tickets to be issued by ticket selling agents, account details to be issued by automatic teller machines (ATM) in banks, lottery tickets, or the like.

Preferably, the POS system further comprises advertising addition determining means for determining to add the advertising information to the receipt printing information when the receipt printing information meets an adding condition for adding the advertising information, and the advertising addition determining means is built into the additional apparatus.

According to this arrangement, the issuance of the advertising information can be limited to the case where the receipt printing information meets the adding condition for adding the advertising information. It is thus possible to vary the contents of the advertisement and the method of advertising. In addition, since the addition of the advertising information is determined (or limited) by the additional apparatus, it is possible to make versatile the contents of the advertisement or the method of advertising without largely modifying the existing POS servers or the terminal apparatuses.

Preferably, the advertising addition determining means obtains adding condition information about the adding condition from the advertising information providing means.

According to this arrangement, the advertising information and the adding condition information can be obtained simultaneously from the advertising information providing means. Further, since the party or person who provides the advertising can also provide the above-described pieces of information simultaneously, the time can be saved.

Preferably, the receipt printing information is based on input information about sale of commodity, and the adding condition information contains information about a kind of the commodity.

According to this arrangement, it is possible to determine whether the advertising information shall be added or not based on the information about the kinds of commodity such as classification of commodity, name of commodity, code of commodity, selling company, name of country from which the commodity are imported, or the like. Therefore, it is possible to use this system by passing judgment that an advertising pieces of information shall be added to the commodity, e.g., in the form of stationery when sold by a retail shop.

Preferably, the receipt printing information is based on input information about sale of commodity, and the adding condition information contains information about a total amount of the commodities whose prices are above a predetermined amount.

According to this arrangement, it is possible to determine whether the advertising information shall be added or not based on the information about the total amount of the commodities whose prices are above a predetermined amount. Therefore, in a retail shop, for example, a determination can be made that the advertising information shall be added if the total amount of the commodity is, e.g., above 1,000 yen.

Preferably, the adding condition contains information about a period of adding the advertisement.

According to this arrangement, the information about the period of adding the advertisement makes it possible to determine whether the advertising information shall be added or not. In this manner, it is possible to use this system by, e.g., a ticket selling agent in adding the advertising information only during the period in which a particular event is being performed.

Preferably, the POS system further comprises means for counting a number of times of issuing the receipt, and the adding condition information contains information about the number of times of issuing.

According to this arrangement, the information about the number of times of issuing the receipt makes it possible for the user to determine whether the advertising information shall be added or not. In this manner, this system can be used, e.g., by issuing a "lucky ticket or winning ticket" whenever the last two digits of the number of times of issuing fall on "00" in an apparatus for issuing lottery tickets, or the like.

Preferably, the input information and the receipt printing information contain customer information, and the adding condition information contains information about a kind of the customers.

According to this arrangement, depending on the information about the kind of the customer, such as sex, age, nationality, occupation, membership, or the like, a determination can be made as to whether the advertising information shall be added or not. It is thus possible to use this system by adding the advertising information, e.g., only to the male persons or to adults.

Preferably, the adding condition information contains information about a command for controlling the printing apparatus.

According to this arrangement, a determination can be made as to whether the advertising information shall be added or not based on that information about the command for controlling the printing apparatus which is obtainable from the receipt printing information. Therefore, in case the advertising information is added along with a command of cutting the receipt, the system can be used to add the advertising information at a predetermined position (in this particular case, at the bottom of the receipt).

Preferably, the receipt printing information contains information about shops, and the adding condition information contains the information about the shops.

According to this arrangement, a determination can be made as to whether the advertising information shall be added or not based on the information about the shops. Therefore, this system can be used by adding the advertising information, e.g., only to the shops having a shop name "ABC" (the information being, e.g., telephone number, address, or the like, of the ABC shop).

Preferably, the POS system further comprises addition number-of-times counting means for counting a number of times of adding the advertising information and, when the addition number of times meets the adding condition for adding the advertising information to the receipt printing information, the addition of the advertising information to the receipt printing information is determined.

According to this arrangement, it can be determined to add the advertising information only when the addition number of times meets the adding condition for adding the advertising information to the receipt printing information. Therefore, this system can be used by determining not to add the advertising information, e.g., once the number of times of addition has exceeded 500 times.

Preferably, the additional apparatus is an interface unit mounted in a board slot in the printing apparatus, and the advertising information providing means is detachably mounted on the interface unit and is constituted by a memory medium having stored therein the advertising information. The interface unit preferably comprises an interface section which is connectable to a network, and the POS system preferably further comprises a second advertising information providing means for providing the advertising information through the network.

According to the above arrangement, it is possible to obtain the advertising information not only from the memory medium but also from other means (second advertising information providing means and network). In other words, a quick remedial action ca be taken even when the memory medium has some deficiency or defect, or when a trouble occurs to the apparatus for reading the information from the memory medium.

Preferably, the additional apparatus is constituted by an adapter device connectable to the printing apparatus, and the advertising information providing means is connected to the adapter device.

According to this arrangement, when the adapter device is connected to the printing apparatus, the printing data can be generated inside the adapter device by adding the advertising information to the receipt printing information obtained from the terminal apparatus. Therefore, without largely modifying the existing POS servers or the POS terminals, it is possible to establish the POS system in which the advertising information can be added. In addition, by using the adapter device which can be connected to the printing apparatus through a connector, or the like, the additional apparatus can be easily attached to, or mounted on, the POS system as it is. It is therefore possible to cope with various kinds of POS systems.

Preferably, the adapter device and the printing apparatus are wirelessly connected together.

According to this arrangement, the freedom in laying out the adapter device, terminal apparatus and the printing apparatus can be improved.

Preferably, the POS system further comprises a control server for managing the advertising information. The control server is connected to the POS terminal through a second network which is different from a first network which connects the POS terminal and the POS server. The advertising information providing means is constituted by the control server. The POS terminal and the second network are connected together through the adapter device.

According to this arrangement, the advertising information can be obtained from the control server which is connected to the POS terminal through the second network which is different from the first network. Therefore, without modifying the existing POS servers at all, there can be established a POS system in which the advertising information can be added. In addition, in case a plurality of POS servers are connected to a single control server, the control server can perform a sole management of the advertising information over the plurality of POS terminals. Still furthermore, since the POS terminal and the second network are connected through the second network, the advertising information can be provided without modifying the POS terminal (terminal apparatus and the printing apparatus).

Preferably, the advertising information providing means is constituted by a memory medium having stored therein the advertising information and the memory medium is detachably mounted on the adapter device.

According to this arrangement, since the advertising information is stored in the memory medium which is detachably mounted on the adapter device, the advertising information can easily be changed by replacing it.

Preferably, the printing apparatus is capable of performing color printing, the advertising information contains color information, and the printing data are generated based on the color information.

According to this arrangement, since the advertising information can be printed in color, the advertisement can be made more impressive on the customer. In addition, the printing data are generated by the additional apparatus. Therefore, even in case where the terminal apparatus can only cope with monochromatic printing (i.e., in case where the receipt printing information is not constituted to include color information), the advertising information can still be printed in color.

According to still another aspect of this invention, there is provided a network system comprising: a plurality of the above-described POS systems; a Web server for performing advertising information management with respect to all control servers, the Web server being connected through a third network which is different from the first network and the second network, wherein the advertising information providing means provides advertising information and adding condition information provided by the Web server.

According to this arrangement, without largely modifying the existing POS server and the terminal apparatus, the Web server can perform the advertising information management to the control servers for a plurality of POS systems to which the advertising information can be added. In other words, the Web server can collectively provide the plurality of POS systems with the advertising information and the adding condition information.

According to still another aspect of this invention, there is provided a network system comprising: a POS system and a Web server. The POS system comprise: a POS terminal having a printing apparatus for printing on a receipt based printing data, and a terminal apparatus for obtaining input information inputted by a user and for generating receipt printing information; a POS server connected to the POS terminal through a first network in order to control the POS terminal; a control server connected to the POS terminal through a second network in order to provide the POS terminal with advertising information and to obtain the receipt printing information from the POS terminal; and an adapter device which is connected to the printer apparatus and generates the printing data by adding the advertising information provided by the control server to the receipt printing information obtained by the terminal apparatus. The Web server is connected to a plurality of the control servers through a third network to provide the control servers with the advertising information and to perform the management of sales and customer information of all of the control servers based on the receipt printing information obtained by the control servers. The Web server counts a grand total of points given to an individual customer based on the receipt printing information.

According to this arrangement, without largely modifying the existing POS server and the terminal apparatus, the grand total of the points can be computed by the Web server for an individual customer with respect to the plurality of POS systems to which the advertising information can be added. The customer service can thus be performed such as offering services complying with the points. In other words, there can be established a network system which can perform efficient management of the sales and customer information and the advertising information, without largely modifying the existing POS system.

Preferably, the Web server transmits information about grand total of the counted points to the adapter device through the control server, and the adapter device adds the transmitted information about the grand total of points, thereby generating the printing data.

According to this arrangement, by indicating on the receipt the information about the grand total of points computed by the Web server, it can be shown to the customer, or the receipt in which the grand total of points is indicated can be utilized as a coupon in offering services to the customer.

Preferably, when the grand total of the computed points has reached a predetermined number of points, the Web server transmits the information about the grand total of points to the adapter device.

According to this arrangement, when the grand total of the computed points has reached, e.g., 100, it can be indicated on the receipt, which can then be used in offering services to make it serve as a shopping card equivalent to 100 yen.

According to still another aspect of this invention, there is provided a method of generating printing data for a POS system, comprising: a first step of inputting receipt printing information into the POS system controlled through a network; a second step of providing advertising information; and a third step of generating printing data by adding the advertising information provided in the second step to the receipt printing information inputted in the first step; wherein the third step is carried out by means arranged to be detachably connectable to the POS system.

According to another aspect of this invention, there is provided a method of generating printing data for a POS system. The POS system comprises: a POS terminal having a printing apparatus for printing on a receipt based on printing data, and a terminal apparatus for obtaining input information inputted by a user and for generating receipt printing information based on the input information; a POS server connected to the POS terminal through a network, for controlling the POS terminal; advertising information providing means for providing advertising information; and an additional apparatus connectable to the printing apparatus. The method comprises: a first step of obtaining the receipt printing information from the terminal apparatus; a second step of providing advertising information; and a third step of generating printing data by adding the advertising information provided in the second step to the receipt printing information inputted in the first step, wherein the third step is carried out by the additional apparatus arranged to be connectable to the POS system.

Preferably, the addition of the advertising information to the receipt printing information is determined by the additional apparatus when the receipt printing information meets a term of adding the advertising information.

Preferably, the advertising information is obtained through a network connected to the additional apparatus.

According to yet another aspect of this invention, there is provided a method of managing sales and advertisement information in a network system. The network system comprises a POS system and a Web server. The POS system comprises: a POS terminal having a printing apparatus for printing on a receipt based on printing data, and a terminal apparatus for obtaining input information inputted by a user and for generating receipt printing information; a control server connected to the POS terminal through a second network in order to provide the POS terminal with advertising information and to obtain the receipt printing information from the POS terminal; and an adapter device which is connected to the printer apparatus and generates the printing data by adding the advertising information provided by the control server to the receipt printing information obtained by the terminal apparatus. The Web server is connected to a plurality of the control servers through a third network to provide the control servers with the advertising information and to perform the management of sales and customer information of all of the control servers based on the receipt printing information obtained by the control servers. The method comprises computing by the Web server a grand total of points given to an individual customer, the computing being based on the receipt printing information.

BRIEF DESCRIPTION OF THE DRAWINGS

FIGS. 2A and 2B are external perspective views of the POS system according to the first embodiment of this invention, in which FIG. 2A is a front view and FIG. 2B is a rear view thereof;

FIG. 10 is a schematic diagram showing an example of the POS system according to a third embodiment of this invention;

DETAILED DESCRIPTION OF THE PREFERRED EMBODIMENTS

A description will now be made about a POS system, an interface unit, an adapter device, a network system, a method of generating printing data for a POS system, and a method of managing sales and advertisement information in a network system, all relating to this invention, with reference to the accompanying drawings.

Figure 1:
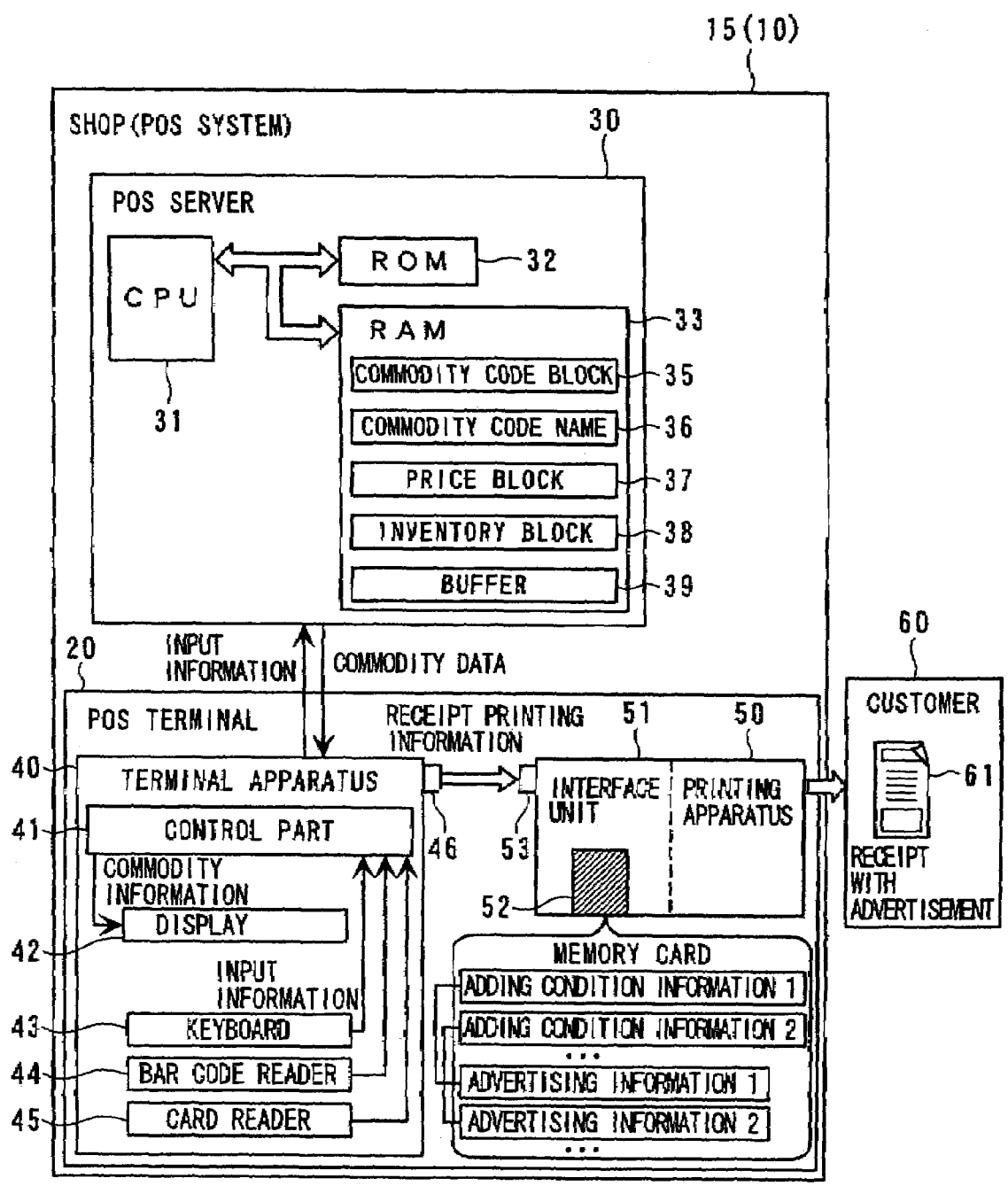
FIG. 1 is a schematic diagram showing the POS system according to first embodiment of this invention.

As shown in FIG. 1, the POS 10 system according the first embodiment of this invention is made up of: a plurality of POS terminals 20 (though only one is illustrated) which obtains input information as a result of reading by an operator (a user) of a bar code which is attached to a commodity or goods for sale; and a POS server 30 which is connected through a network to the POS terminals 20 and performs control over the input information to be inputted into the POS terminals 20.

The POS server 30 is provided with a memory such as a read-only memory (ROM) 32 and a random access memory (RAM) 33 as well as a control apparatus (central processing unit, CPU 31). Processing of information stored in a buffer 39, or the like, is performed in accordance with a control program stored in the ROM 32. The RAM 33 contains therein a commodity code block 35, a commodity name block 36, a price block 37, and an inventory block 38. The CPU 31 extracts the information about commodity codes, commodity names, and prices based on the inputted information transmitted from the POS terminals 20, and generates commodity data for use in printing on a receipt 61 and displaying on a display 42 of the POS terminal 20. The term "commodity data" refers to the data which serve as the basis for the commodity information to be printed on the receipt 61.

The POS terminal 20, on the other hand, is made up of: a terminal apparatus 40 which generates the receipt printing information based on the commodity data transmitted from the POS server 30 and the input information; and a printing apparatus 50 (a receipt printer) which performs printing on the receipt 61 based on the receipt printing information. The POS terminals 20 are connected to one another through connectors 46, 53. The terminal apparatus 40 obtains the input information such as the one about the commodity (commodity information) or the one about the customers (customer information) obtained by means of a keyboard 43 or a bar code reader 44. Further, reading is made by a card reader 45 of credit cards and membership cards of the customers 60 to thereby obtain information about the credit settlement or the information about the membership number, or the like. In addition, there is provided a display 42 for displaying the commodity information which is generated based on the commodity data transmitted from the POS server 30 to thereby present to the customer 60 the price, or the like, of the commodities purchased by him or her.

The printing apparatus 50 has mounted thereon an interface unit 51 (also generically referred to as an additional apparatus) on which a memory card 52 having stored therein the advertising information is detachably mounted. This interface unit 51 generates printing data to be printed on the receipt 61. Though details are given hereinafter, the generation of the printing data is performed by adding the advertising information obtained from the memory card 52 to receipt printing information generated by the terminal apparatus 40. A receipt 61 containing therein the advertising information is issued to the customer 60 and the advertising is thereby offered thereto.

The printing apparatus 50 is capable of printing in a mode of monochromatic printing and in a mode of color printing. It is so constituted that either of the above two modes can be selected, e.g., by means of a dual inline package (DIP) switch provided in the printing apparatus 50. The interface unit 51 obtains this information about the mode setting to determine whether color information shall be included in the printing data to be generated. Therefore, in case the setting has been made to the color printing mode and in case color information is included in the printing data (e.g., in case color information is included in the advertising information), multi-color printing can be performed based thereon on the receipt.

Even in case the printing apparatus 50 corresponds to the monochromatic printing only or to the color printing only, the interface unit 51 obtains the information about the printing apparatus 50, whereby there can be generated the printing data complying with the printing apparatus. As described above, since the printing data are generated by the interface unit 51, the advertising information portion can be printed in color even in case the terminal apparatus 40 can correspond only to the monochromatic printing (i.e., in case it is so arranged that the color information is not included in the receipt printing information).

Figure 8:
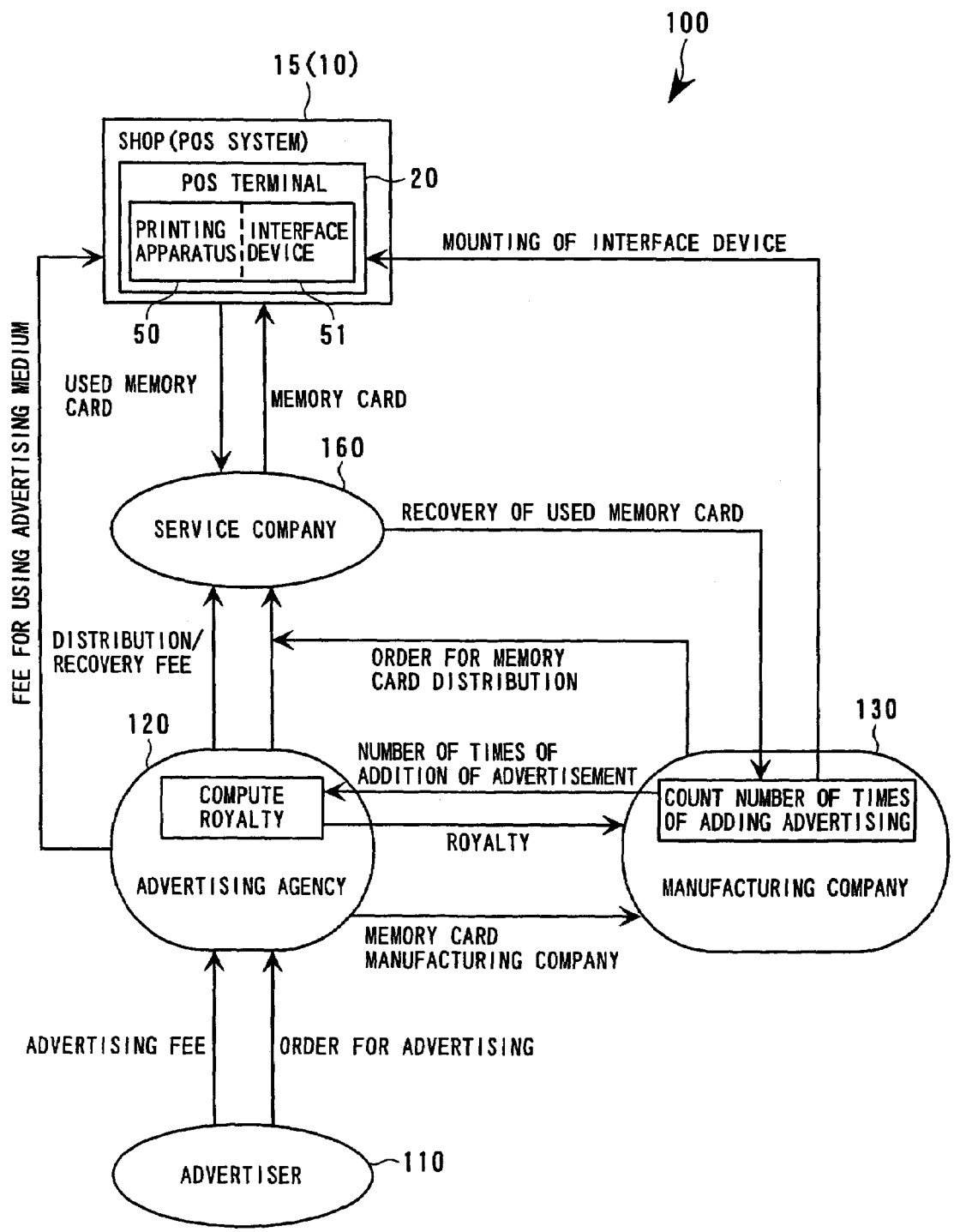
FIG. 8 is a schematic diagram showing an example of distribution/collection system of the memory card to be used in the above POS system.

The memory card 52 stores therein plural pieces of advertising information which are constituted by character strings (text data), commands, graphical (image) data, bar codes, two-dimensional symbols, or the like. Each piece of the advertising information is stored in correlation with adding condition information which is the information about a condition for adding the advertising information. Therefore, a determination as to which particular advertising information shall be added out of the plural pieces of advertising information stored in the memory card 52, is made by judging which particular adding condition is satisfied by the obtained receipt printing information. Description is made hereinafter about the method of distribution and method of recovering the memory card 52 with reference to a distribution/collection system 100 in FIG. 8.

Figure 2A:
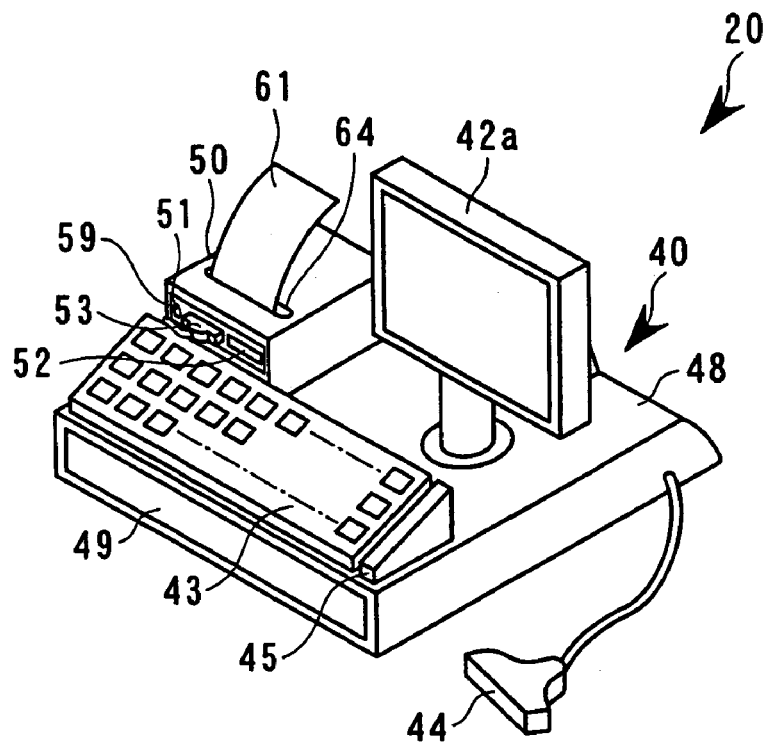
Figure 2B:
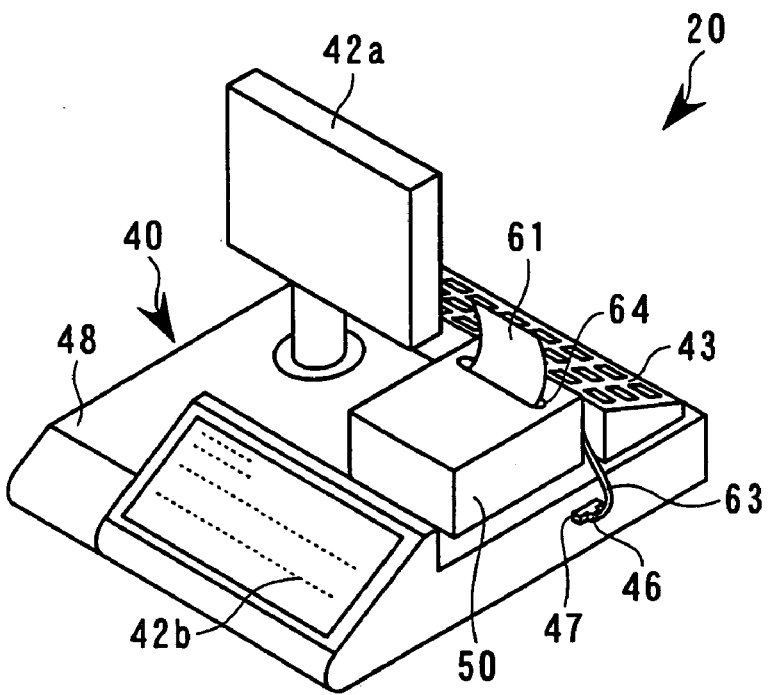

A description will now be made about the arrangement of the POS terminal 20 with reference to FIGS. 2A and 2B. FIG. 2A is a front perspective view of the POS terminal 20 as seen from the operator's side, and FIG. 2B is a rear perspective view thereof as seen from the customer's side. As shown in both figures, the POS terminal 20 is made up of a terminal apparatus 40 whose main part is made of a box-shaped main-body case 48, and the printing apparatus 50 which is disposed in the rear left side of the main-body case 48. The printing apparatus 50 is connected to the main-body case 48 by a cable and, therefore, the position of laying it out is not limited to the illustrated one but can be arbitrarily selected within the reach of the cable length.

The terminal apparatus 40 has: a keyboard 43 which is disposed on an upper front part of the main-body case 48 and which is used by the operator to input the information such as the commodity information, the customer information, or the like; and a display 42*a* for the operator which is disposed on a rear right part of the main-body case 48 and which is used by the operator in confirming the inputted information. A cash drawer 49 is housed inside the main-body case 48. A bar code reader 44 is provided on the right side of the main-body case 48, a main-body-side interface section 47 for connection to the printing apparatus 50 is provided on the left side thereof, and a slot 45 for the card reader which functions to read a credit card presented by the customer is formed on the right side of the keyboard 43. On the rear side of the main-body case 48 there is disposed a display 42*b* for the customer for use by the customer in confirming the commodity information, or the like.

In a slot 59 for mounting an interface board (board slot) on a front side of the printing apparatus 50, there is mounted the interface unit 51 which detachably receive therein the memory card 52. The interface unit 51 and the terminal apparatus 40 are connected together by connectors 46, 53. On an upper surface of the printing apparatus 50 there is formed a receipt discharge opening 64 from which the printed receipt 61 is discharged.

Figure 3:
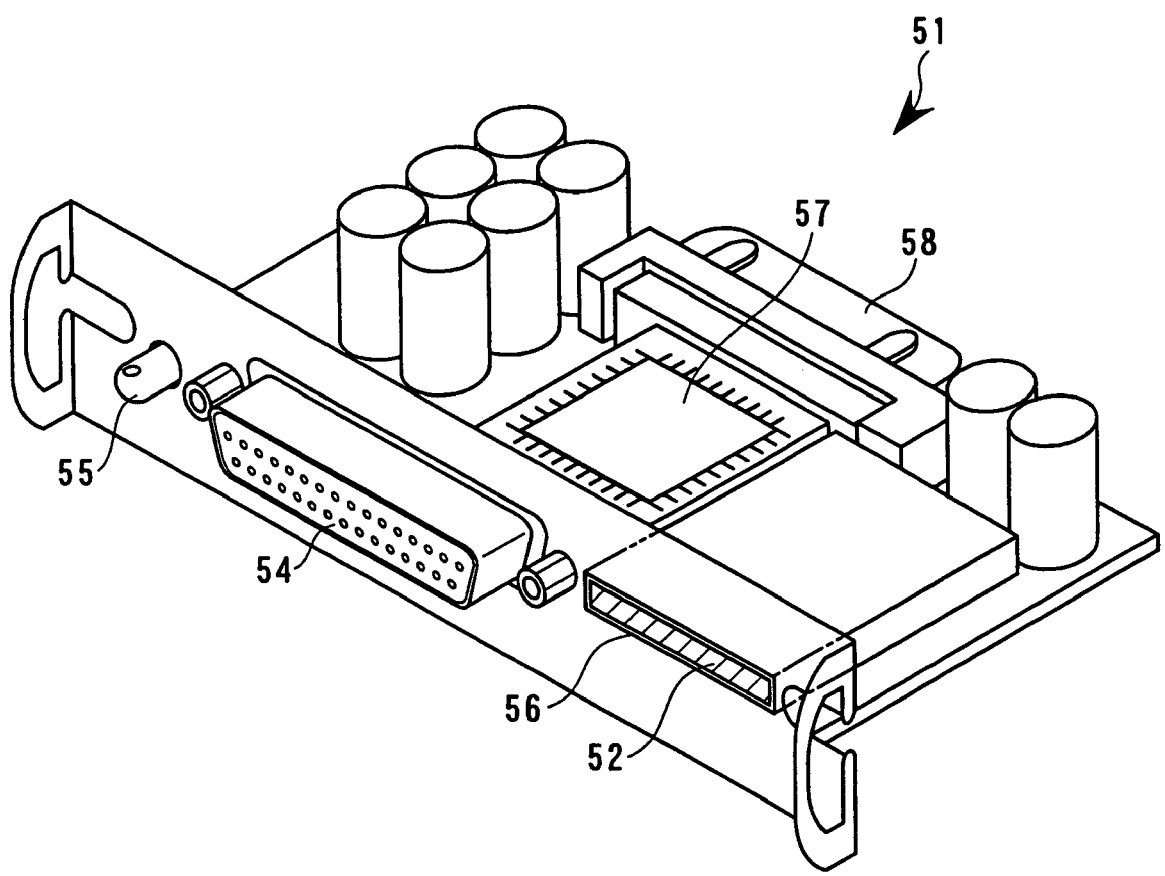
FIG. 3 is an external perspective view of an interface unit according to first embodiment of this invention.

As shown in FIG. 3, the interface unit 51 has disposed therein an operation indicator lamp 55 on the front side, an interface section 54 for the terminal apparatus, and a slot 56 for mounting a memory card. The interface section 54 for the terminal apparatus is connected to the main-body-side interface section 47 by a cable 63 (see FIG. 2B). The interface unit 51 is provided in a central part thereof with a control board 57 (see FIG. 5) having a CPU 91, as well as a memory such as a ROM 92, a RAM 93, or the like and is provided, in a rear part thereof, with an interface section 58 for the printing apparatus. The interface section 54 for the terminal apparatus, the interface section 58 for the printing apparatus, the operation indicator lamp 55, the ROM 92 and the RAM 93 are connected to one another by a bus.

The interface section 54 for the terminal apparatus and the interface section 58 for the printing apparatus may be of serial data transmission of RS-232 standard, or the like, parallel data transmission of Centronics standard, or the like, 10Base-T network connection of Ethernet type local area network (reg. ™), or the one corresponding to the data transmission of Universal Serial Bus (USB), or the like.

In case the driving voltage level is different between the Transistor Transistor Logic (TTL) of the interface unit 51 and the internal component of the terminal apparatus 40 or the printing apparatus 50, it is preferable to provide the interface section 54 for the terminal apparatus and the interface section 58 for the printing apparatus with a driver circuit to perform level conversion. The signal level can thus be easily converted.

Figure 4:
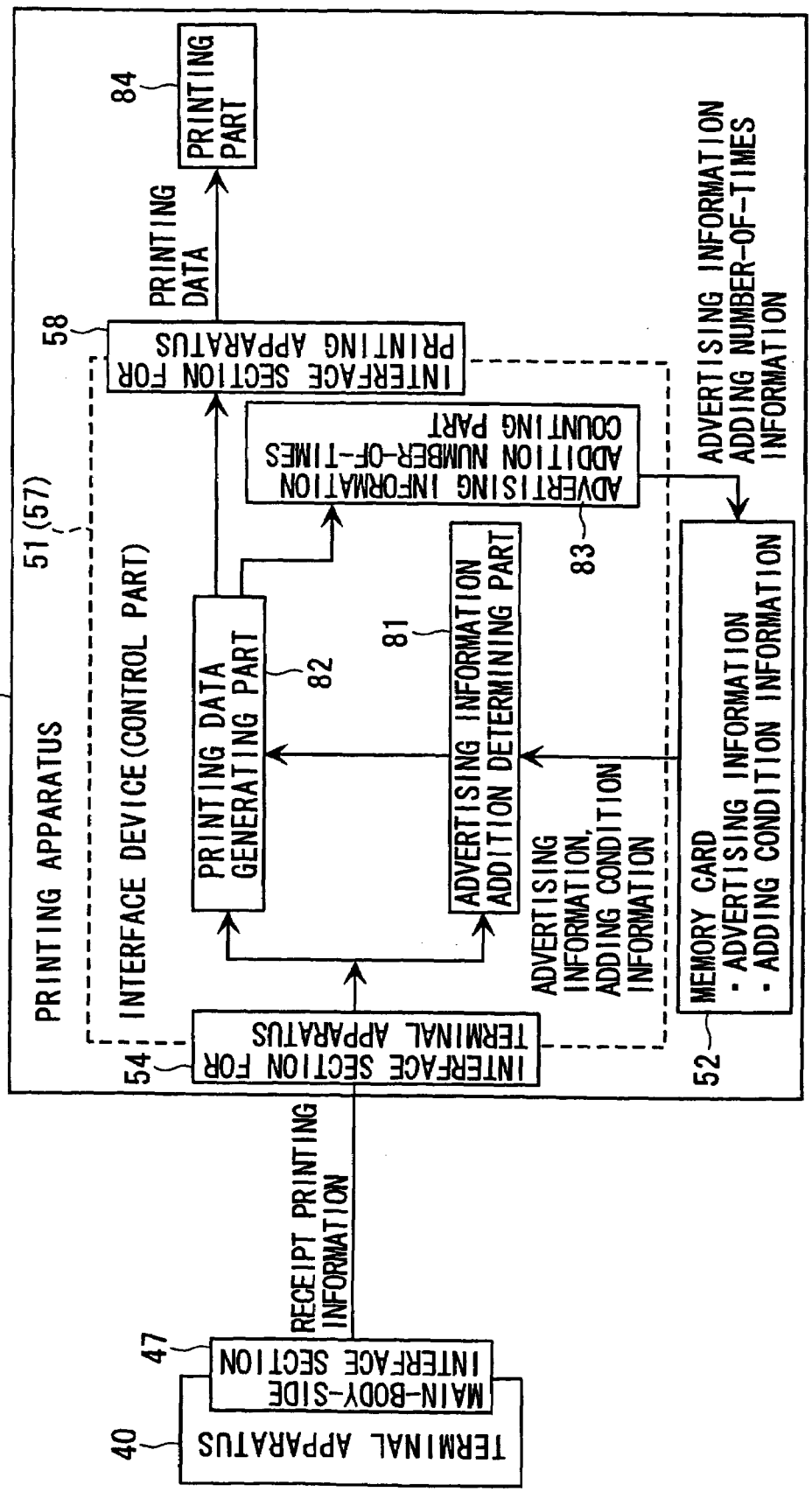
FIG. 4 is a block diagram showing the function of the above interface unit.

A description will now be made about the control of the interface unit 51 with reference to the block diagram in FIG. 4. The control part 57 of the interface unit 51 is provided with: an "advertising information addition determining part 81" which reads out the advertising information and the adding condition information stored in the memory card 52 and determines to add the advertising information which is correlated with the adding condition information when the receipt printing information that meets the adding condition information has been detected; a "printing data generating part 82" which generates the printing data by adding to the receipt printing information the advertising information that has been decided to be added by the advertising information addition determining part 81; and an "advertising information addition number-of-times counting part 83" which counts the number of times of operations for adding the advertising information by the printing data generating part 82. The above-described parts are mainly constituted by the CPU 91.

Figure 5:
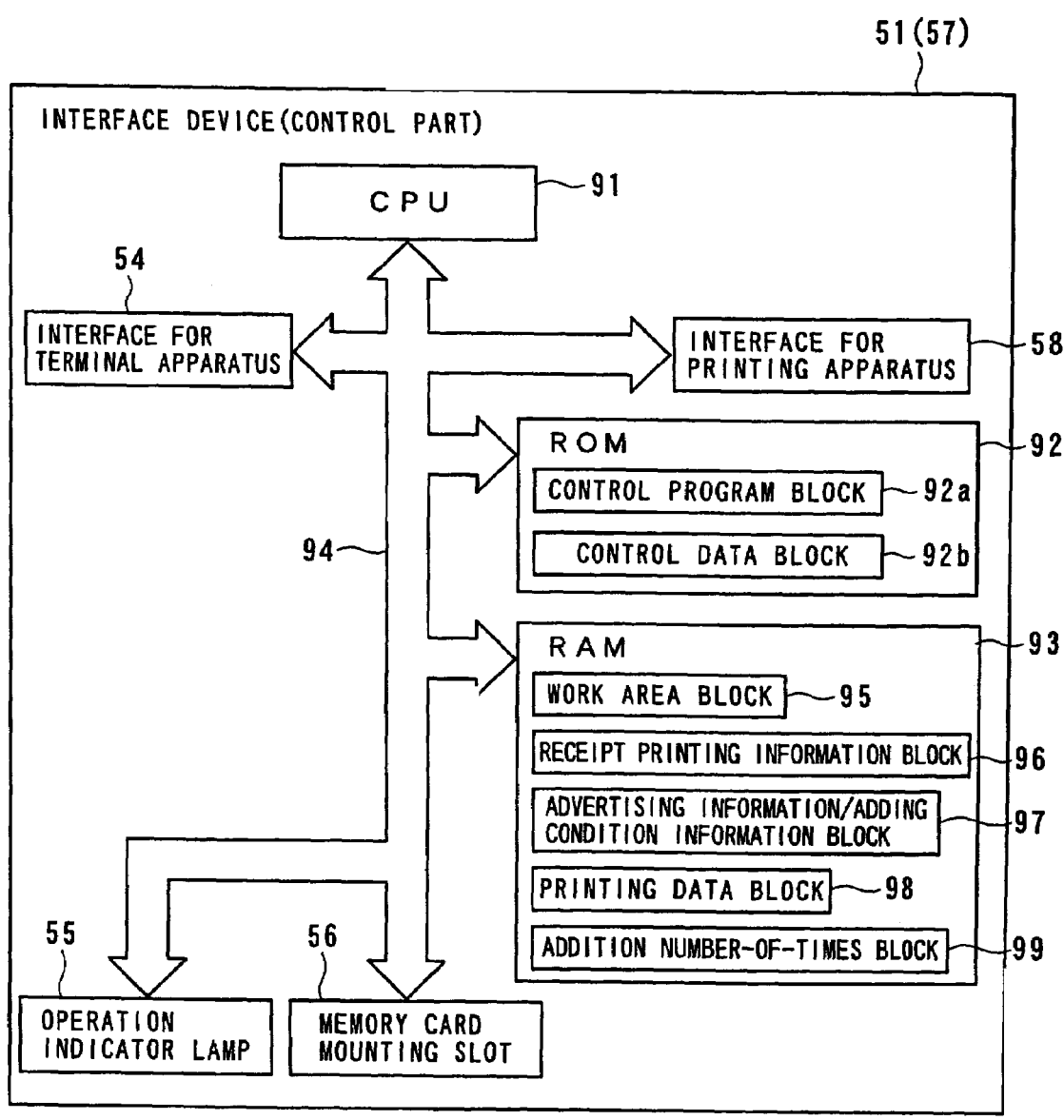
FIG. 5 is a block diagram showing the control of the above interface unit.

As shown in the block diagram in FIG. 5, the control part (control board) 57 has the CPU 91, ROM 92 and RAM 93 and they are connected to one another by an inner bus 94. The ROM 92 has a control data block 92b which stores therein the control data inclusive of various tables, as well as a control program block 92a which stores therein the control program to be processed in the CPU 91.

The RAM 93 has, aside from the various work area block 95 to be used as flags, or the like: a receipt printing information block 96 which stores therein the receipt printing information which is sent from the terminal apparatus 40; an advertising information/adding condition information block 97 which stores therein the advertising information and the adding condition information read out from the memory card 52; a printing data block 98 which stores therein the generated printing data; and adding number block 99 which stores therein the information about the number of times of addition of the advertising information. The RAM 93 is used as the working area for the control processing.

The inner bus 94 is also connected to the interface section 54 for the terminal apparatus, the interface section 58 for the printing apparatus and the slot 56 for mounting the memory card. The inner bus 94 captures the input data (e.g., receipt printing information, advertising information, adding condition information, or the like), and outputs the data (printing data, or the like) and the control signal which are outputted from the CPU 91, or the like, to the printing part 84 (see FIG. 4), or the like, through the interface section 58 for the printing apparatus.

According to the above-described arrangement, the CPU 91 inputs various signals/data, or the like, from the various parts of the interface unit 51 based on the control program inside the ROM 92 to thereby process various data, or the like, inside the RAM 93. In addition, by outputting various signals/data, or the like, to each part, the CPU 91 performs an overall control over the interface unit 51 such as the generation of the printing data, the counting of the time of adding the advertisement, or the like.

Figure 6:
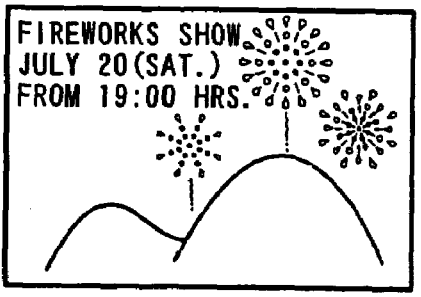
FIG. 6 is an example of a receipt to be issued by the above POS system, with an advertising added thereto.

The receipt printing information is information generated by the terminal apparatus 40. As shown in FIG. 6, the following pieces of information are included, e.g.: information about the name of the shop and its logo mark which are always printed in a given position of the receipt 61; information about the number of times of issuing in which the number of times of issuing the receipt 61 is counted; information about the date and time as counted by a timer inside the POS server 30 or the terminal apparatus 40; commodity information about the commodities purchased by the customer 60 and their unit prices as well as the total price; and customer information to identify the customer 60 such as the membership number, or the like. The advertising information to be added by the printing data generating part 82 (see FIG. 4) is the information other than the above-described receipt printing information such as the advertising information about the commodity advertising, announcement of the events, or the like, as shown in FIG. 6.

In the "advertising information addition determining part" (see FIG. 4), when the receipt printing information to be sent from the terminal apparatus 40 meets the adding condition information, it is determined to add the advertising information which is co-related to the adding condition information. The adding condition as well as the adding processing when the adding condition is met, will now be described with reference to some examples.

EXAMPLE 1

In case the adding condition information is "information about the kind of commodities," the addition of the advertising information can be determined depending on whether or not the information about the kind (classification of commodities, names of commodities, codes of commodities, selling companies, countries from which the commodities are imported, or the like) is included in the receipt printing information. In other words, if, e.g., the commodity is the product of "AA" company, the advertising information shall be added to the products thereof.

EXAMPLE 2

In case the adding condition information is "information about the total amount of commodities above a predetermined amount," the total amount in the receipt printing information is detected. If the total amount exceeds a predetermined amount, the addition of the advertising information is determined. In other words, the information can be used in determining to add the advertising information if the total amount is, e.g., above 1,000 yen.

EXAMPLE 3

If the adding condition information is "information about the period of adding advertising information," the information about the date and time of the receipt printing information is detected so that the determination as to whether the addition of the advertising information shall be made or not can be made by the date and time thereof. In other words, the information can be used in determining to add the advertising information only during the period, e.g., of 1500 to 1700 hours or only in April and May.

EXAMPLE 4

In case the adding condition information is "information about the number of times of issuing receipts," the information about the number of times of issuing the receipt printing information is detected so that the addition of the advertising information can be determined by the numbers in question. In other words, in case the receipts are issued as the ones having the function of lottery tickets, the lucky tickets may be issued for the receipts whose last two digits of the number of times of issuing fall on "00." In this case, preferably, there is provided means for counting the number of times of issuing the receipts inside the terminal apparatus.

EXAMPLE 5

In case the adding condition information is "information about the kind of customers," the customer information in the receipt printing information is detected. Based on the information about the kind (sex, age, nationality, occupation, membership, or the like) of the customer 60, the addition of the advertising information can be determined. In other words, the advertising information can be added, e.g., only when the customer is identified to be male based on the membership number which identifies the customer 60.

EXAMPLE 6

In case the adding condition information is "information abut the command to control the printing apparatus," the command contained in the receipt printing information is detected so that the addition of the advertising information can be determined. In other words, the addition of the advertising information can be determined in response to the command to order "paper feeding to find a predetermined beginning, and automatic cutting off." In this manner, the information can be utilized in adding the advertising information to the predetermined position of all the receipts 61 (e.g., in case "insert the advertising information before command" is performed, the adding position is at the lowest portion of the receipt 61; details will be described hereinafter).

EXAMPLE 7

In case the adding condition information is "information about shops," the information about the shops 15 (names of shops, codes of shops, or the like) in the receipt printing information is detected so that the addition of the advertising information can be determined by this information about the names of the shops. In this case, it is also possible to make the advertising information in logo marks which are represented by graphic data, or the like. In other words, when the name of a shop is detected, the logo mark of that shop is also added. In addition, when the name of the shop is detected, it may be replaced by the logo mark (this operation is performed in performing an action of "change name of shop for advertising information (logo mark)." In this manner, by printing the logo mark on the receipt, the image of the shop left on the customer 60 can be improved. This impression can further be improved by printing the logo mark in color.

Some examples have been recited hereinabove. These examples may be used by combining them. For example, suppose the adding condition information serves the dual purposes of "information about the kind of commodities" and "information about the period of adding the advertising information." In case the information about a commodity, e.g., smashed ice mixed with sweets (information about the kind of commodities) peculiar to the particular season, e.g., summer season, i.e., June through August (information about the period of adding the advertising information) is detected, the advertising information may be added.

As described above, the adding condition information and the advertising information are co-related together. Therefore, when the adding condition 1 is met, the advertising information 1 is added, and when the adding condition 2 is met, the advertising information 2 is added. When the adding condition n is met, the adding information n is added. In this manner, depending on the adding condition to be met, the adding information can be determined.

A brief description will now be made about the action to be taken regarding the adding condition. When the receipt printing information to be sent from the terminal apparatus 40 meets the adding condition information, i.e., when the data array whose condition meets the condition of the adding condition information has been detected from the receipt printing information, the advertising information representing the advertising information will be added (inserted). In this case, the following actions can be performed and any one may be applied, the actions in question being: "insert advertising data n before data array n having coincident condition," "insert advertising data n after data array n having coincident condition," "replace advertising data n with data array n having coincident condition," "replace advertising data n with data array (command) n having coincident condition and parameter that follows it," "insert advertising data n into the end (after completion of transaction) of receipt printing information inclusive of data array n having coincident condition," or the like.

It is also possible to perform a plurality of actions to one data array having coincident condition. Further, in case a plurality of data arrays having coincident condition are included in a single piece of receipt printing information, a receipt containing a plurality of advertising information can also be issued. In this embodiment, in order to simplify the explanation, it is presumed that a plurality of coincident conditions are not included in a single piece of receipt printing information and that there is performed an action "in case data array having coincident condition is contained in the receipt printing information, insert advertising data n at the end of the receipt printing information."

It may also be so arranged that an advertising information is added by using a flag; then, the processing such as the following becomes possible. Namely, in case the adding condition information is "detect data array having coincident condition" and "set flag 1," "if data array n having coincident condition is detected, set flag 1" is performed as action 1, and "replace advertising data n with data array n having coincident condition, and reset flag 1" is performed as action 2.

In this embodiment, as the adding condition, there is included "information about the number of times of addition of the advertising information." This "information about the number of times of addition of the advertising information" is not detected out of the receipt printing information to be transmitted from the terminal apparatus 40. The addition of the advertising information is determined based on the result of counting, by the printing data generating part 82 (see FIG. 4), of the number of times of adding the advertising information as counted by an advertising information addition number-of-times counting part 83. Therefore, this "condition for the number of times of addition" is stored in advance in the interface unit 51. In this embodiment, it is so arranged that, whenever the number of times of advertising has exceeded a predetermined number of times, the addition of the advertising addition information is stopped. In other words, in this processing, the number of times of adding the advertising information by the printing data generating part 82 is counted by the advertising information addition number-of-times counting part 83 and, if the number of times of counting meets the adding condition (in case the predetermined number of times has not exceeded), the addition of the advertising information can be determined.

The "information about the number of times of adding advertising information" which is the result of counting the number of times of addition by the advertising information addition number-of-times counting part 83 (see FIG. 4) is stored in the memory card 52 and, therefore, the number of times of addition can be obtained from the memory card 52. An advertising fee to be paid by an advertiser or sponsor 110 (manufacturer, or the like) is computed from the number of times of addition obtained as described above. Details thereof will be given hereinafter.

As the "condition for the number of times of addition," it may also be so arranged that the range is set of the number of times of addition, aside from the upper limit thereof. In other word, for the number of times of addition in the range of 101 times to 200 times, advertising information which is different from the one used up to 100 times may be employed.

In the same manner as when the data array having coincident condition is detected out of the receipt printing information, there may be employed an arrangement that the "condition for number of times of addition" is stored in the memory card 52 as the adding condition information.

The number of times of addition may also be counted for every advertising information, or else, a total number of times of addition of plural pieces of advertising information may be counted.

The "information about the number of times of issuing receipts" described in Example 4 as the information about the adding condition may also be arranged to be stored in advance in the memory card 52, instead of the arrangement in which it is read out form the memory card 52 in the same manner as the "information about the number of times of adding advertising information." In this case, there may be provided inside the interface unit 51 a means for counting the number of times of issuing the receipts.

Figure 7:
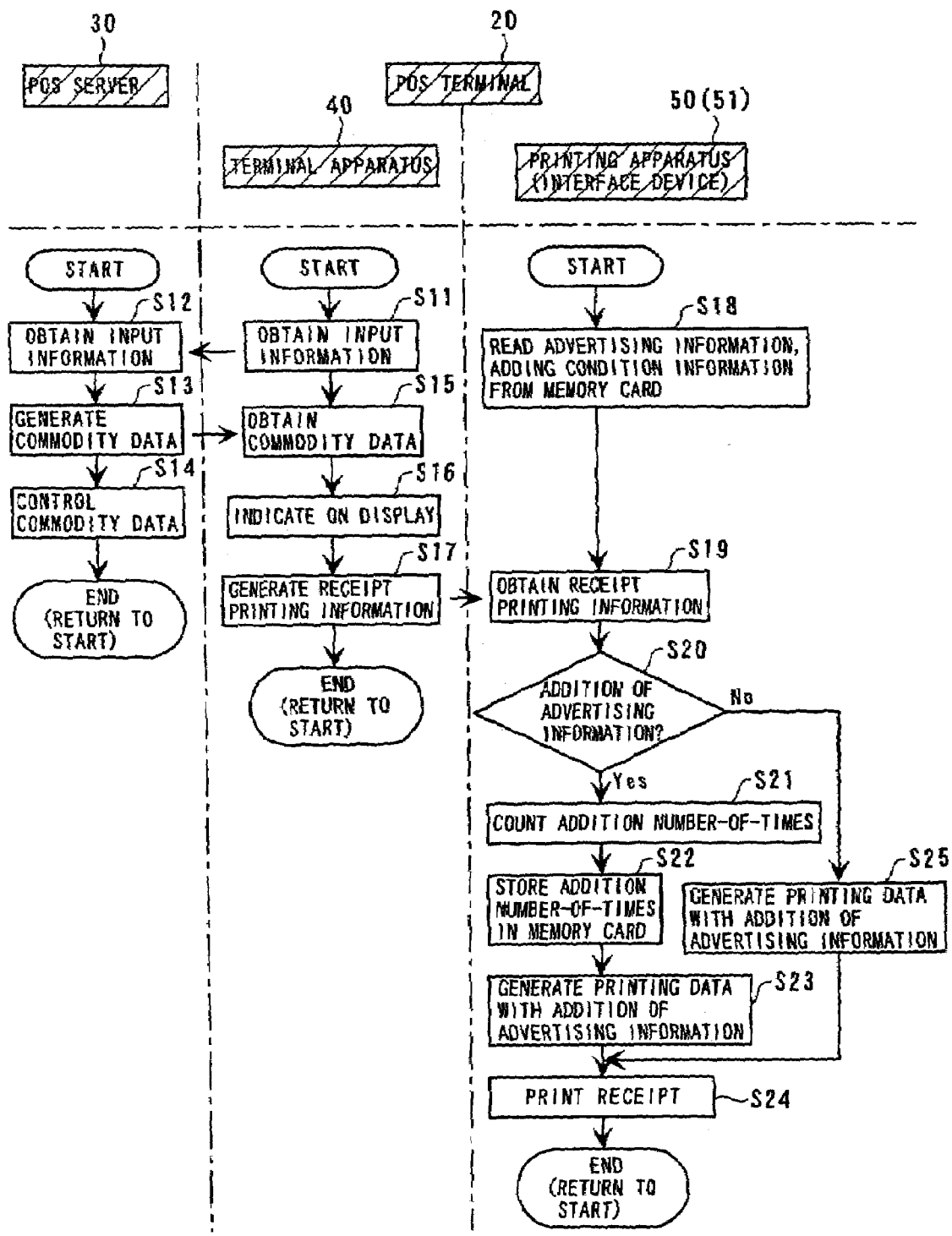
FIG. 7 is a flow chart showing one example of processing in the above POS system.

A description will now be made with reference to the flow chart in FIG. 7 about a series of processing from the inputting of the commodity information and customer information to the addition of the advertising information. First, the operator of the POS terminal 20 inputs the commodity information and the customer information (obtain input information, S11) by using the bar code reader 44, the card reader 45 and the key board 43. The inputted information is transmitted to the POS server 30 (obtain input information, S12). The POS server 30 extracts the information about the commodity code, commodity name, and price based on the input information, and generates commodity data which serve as the basis for the commodity information used in printing on the receipt 61 and in displaying on the display 42 (S13). Then, the generated commodity data are transmitted to the terminal apparatus 40 (obtain commodity data, S15). The POS server 30 also performs commodity data control based on the generated commodity data in order to reduce the stock of the inventory block 38 inside the RAM 33 (S14).

The terminal apparatus 40 indicates the commodity information, or the like, on the display 42a for the operator and on the display 42b for the customer, based on the input information and the transmitted commodity data (S16), and also generates the receipt printing information (S17). The generated receipt printing information is transmitted to the printing apparatus 50 (interface unit 51). The interface unit 51 then obtains it (obtain receipt printing information, S19).

The interface unit 51 reads out from the memory card 52 the advertising information and the adding condition information (S18), and judges whether the transmitted receipt printing information contains therein information that meets the adding condition to thereby determine as to whether the advertising information shall accordingly be added or not (S20). In case the advertising information is added (i.e., in case the receipt printing information meets the adding condition and in case the number of times of advertising falls short of a predetermined time; S20, Yes), the number of times of adding is counted (S21), and stores it into the memory card 52 from time to time (S22). It is thus arranged that the number of times of adding the advertising can be confirmed from the used memory card 52.

Then, the advertising information correlated with the adding condition information that has met the adding condition is added to the end of the receipt printing information to thereby generate the printing data (S23). The printing apparatus 50 performs printing on the receipt based on the printing data (S24). On the other hand, in case the advertising information is not added (i.e., in case the receipt printing information does not meet the adding condition and/or in case the number of times of advertising has reached the predetermined number of times), the printing data are generated without adding the advertising information (by making the receipt printing information to be the printing data as it is, S25), and the printing is performed on the receipt (S24).

As described above, the information about the number of times of adding is arranged to be stored in the memory card 52 (S25) and be capable of confirming the number of times of adding the advertising information from the used memory card 52. A description will now be made about the method of distributing and recovering the memory card 52 (distribution/collection system 100) with reference to FIG. 8.

In this distribution/collection system 100, the advertiser or sponsor 110 such as the manufacturer, or the like, places an order with an advertising agency 120 for advertisement. Based on this order, the advertising agency 120 places an order with a manufacturing company 130 for manufacturing a memory card 52. The manufacturing company 130 forms the advertising information and adding condition based on the requests to thereby manufacture a memory card 52 having stored therein the above. Thereafter, the manufacturing company 130 asks a service company 160 for distributing and/or collecting a memory card to distribute the manufactured memory card 52 either directly or through the advertising agency 120.

The service company 160 distributes this memory card 52 to a shop 15 which is equipped with the POS terminal 20 with the interface unit 51 which is installed in advance on the POS terminal (printing apparatus 50).

The used memory card 52 that has been used by being mounted on the interface unit 51 has stored therein the information about the number of counting of the times of addition as described above. This used memory card 52 is collected by the service company 160 at a regular interval or after the lapse of a predetermined period of time and is returned to the manufacturing company 130. The manufacturing company 130 reads the number of times of addition of the advertising from the used memory card 52 and, based on the number of times of addition, receives a computed royalty from the advertising agency 120. The advertising agency 120, in turn, recovers the advertising fee from the advertiser 110 and pays the distribution/collection fee to the service company 160, and the fee for using the advertising medium to the shop 15 equipped with the POS terminal 20.

In this manner, by offering the advertising information by means of the memory card 52, the distribution and collection thereof can be done easily. In addition, the shop having the POS terminal 20 need only to replace the interface unit 51 and need not largely modify the existing POS system 10. As a result, the POS system 10 that is capable of adding the advertising information can be established with the minimum amount of investment and can earn the fees for using the advertising medium.

As the service company 160, the following may be considered as candidates, e.g., traders who frequently visit the shop 15, domestic-use parcel delivery companies, transportation companies who frequently visit the shop 15 if the shop 15 a supermarket, a convenience store, or the like. According to this arrangement, the delivery and collection of the memory card can be made at the time of picking up the parcels, delivering the commodities, or the like. It follows that they need not go to the trouble of visiting the shops only for the purpose of delivering and/or collecting the memory card 52, resulting in an efficient distribution of the cards and collecting of the fees by the service company 160.

The used memory card 52 has stored therein the information about the count number of the times of the addition. It may be so arranged that this count number is displayed on the display which is disposed in the printing apparatus 50.

A description will now be made about a second embodiment of this invention with reference to FIG. 9. In the above-described first embodiment, it is so arranged that the advertising information is provided or offered from the memory card 52. In this embodiment, on the other hand, the advertising information can be obtained not only from the memory card 52 (252), but also from those distributed through a network. The following description will be focused mainly on what is different from the first embodiment.

Figure 9:
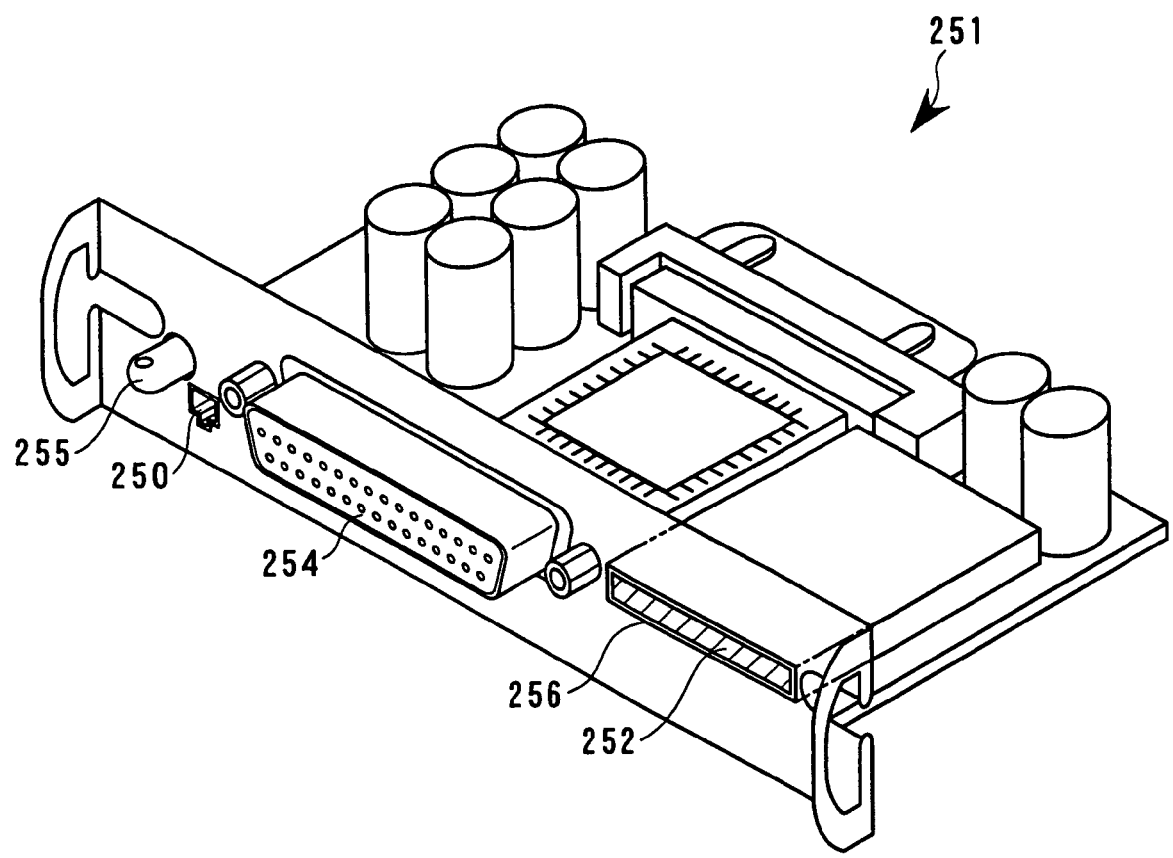
FIG. 9 is an external perspective view of an interface unit according to a second embodiment of this invention.

As shown in FIG. 9, the interface unit 251 has disposed therein an operation indicator lamp 255 on the front side (this side in the figure), an input/output port (network interface) 250 which can be connected to the network, an interface section 254 for use by the terminal apparatus, and a slot 256 for mounting the memory card 252. The input/output port 250 is capable of connection to a network cable such as local area network (LAN) cable, or the like.

Further, it is possible to obtain the advertising information through this input/output port 250 and, thus, the input/output port 250 serves the function auxiliary to the memory card 252. According to this arrangement, in case there is a deficiency in the memory card 252 or in case there occurs a trouble with a device for reading the information from the memory card 252, such a deficiency or trouble can be quickly coped with.

Preferably, an arrangement is made such that the adding condition information can also be obtained through the input/output port 250. According to this arrangement, it is possible to provide the same kind of information as the memory card 252 so as to deal with an unexpected trouble, or the like. It is also possible to arrange that all the advertising information and the adding condition information are obtained through the input/output port 250 without providing the slot 256 for mounting the memory card 256.

A description will now be made about a third embodiment of this invention with reference to FIGS. 10 through 13. In the above-described embodiments, it is so arranged that the printing data are generated by the interface unit 51 which is detachably mounted on the printing apparatus 50. In this embodiment, on the other hand, the printing data are generated by an adapter device 351 (also referred to as an additional apparatus) which is connected to the printing apparatus 50 as a device outside of, or external to, the printing device 50. In this embodiment, the advertising information is obtained from a control server 70 which is connected through an adapter device 351 and a network (second network 12). Therefore, a description will be made only about what is different from the above-described embodiments. The constituent elements which are the same as those in the first embodiment, such as the POS server 30, are explained by giving the same reference numerals as in the first embodiment.

As shown in FIG. 10, the POS system 10 of this embodiment is made up of: a plurality of POS terminals 20 (only one is illustrated) which obtains the input information; a POS server 30 which is connected to the POS terminals 20 through a first network 11 so as to control the input information inputted into the POS terminals 20; a control server 70 which is connected to the POS terminals through a second network 12 so as to control the advertising information; and an adapter device 351 which is connected to the POS terminals 20 and the control server 70 so as to generate the printing data to be printed on the receipt 61.

The POS server 30 has memories such as a ROM 32, RAM 33, or the like, aside from a control device (CPU 31) so as to perform the processing of the information stored in the buffer 39, or the like, inside the RAM 33 according to the control program as stored in the ROM 32. The POS terminal 20, on the other hand, is provided with: a terminal apparatus 40 for generating the receipt printing information based on the commodity data to be transmitted from the POS server 30 and input information; and a printing apparatus 50 (a receipt printer) which performs printing on the receipt 61 based on the receipt printing information. These two apparatuses 20, 50 are connected together through an adapter device 351.

The adapter device 351 is connected to the control server 70 through the second network 12 and obtains through a connector 356 the receipt printing information to be generated by the terminal apparatus 40. The advertising information obtained from the control server 70 is added to the receipt printing information to thereby generate the printing data to be printed on the receipt 61. The generated data are transmitted to the printing apparatus 50 through a connector 357. Like in the interface unit 51 in the above-described embodiment, the adapter device 351 is connected to the control server 70 in order to establish a POS system which can issue the receipt (see FIG. 6) having added thereto the advertising information. By directly connecting the terminal apparatus 40 and the printing apparatus 50 without passing through the adapter device 351, it is possible to issue the receipt having printed thereon an ordinary receipt printing information.

The printing apparatus 50 prints on the receipt based on the printing data generated by the adapter device 351. The receipt 61 with the advertising information added thereto can thus be issued, whereby the advertisement is offered to the customer 60. In this embodiment, it is also possible to print the advertising information in color irrespective of whether the terminal apparatus is capable of printing a color print or not (i.e., even in case where the receipt printing information is not arranged to include the color information).

On the other hand, the control server 70 has a memory such as a ROM 72, a RAM 73, or the like, aside from a control device (CPU 71), and performs the processing of information stored in a buffer 79, or the like, inside the RAM 73 according to the control program stored in the ROM 72. Particularly, the RAM 73 has therein: an advertising information block 75 for storing therein the advertising information (inclusive of those constituted by character array (text data), command, graphics (image) data, bar code, two-dimensional symbols, or the like); an adding condition information block 76 for storing therein the adding condition information which is the condition for adding the advertising information; and an adding number of times block (a block for the adding number of times) 77 for storing therein the number of times of adding the advertising information transmitted from the POS terminal 20. The CPU 71 provides the POS terminal 20 with the advertising information and the adding condition information, and also obtains the information about the number of times of adding the advertising information and stores it in the adding number of times block 77. When the stored number of times of addition has reached a predetermined number, the CPU 71 stops the offering of the advertising information.

The advertising information block 75 and the adding condition information block 76 store therein plural pieces of advertising information and adding condition information, respectively. They are stored in correlation with each other and provides the POS terminal 20 with the information together with the related information. Therefore, as to which advertising information shall be added out of the plural pieces of provided advertising information, is determined based on which adding condition is met by the receipt printing information obtained by the adapter device 351.

Figure 11:
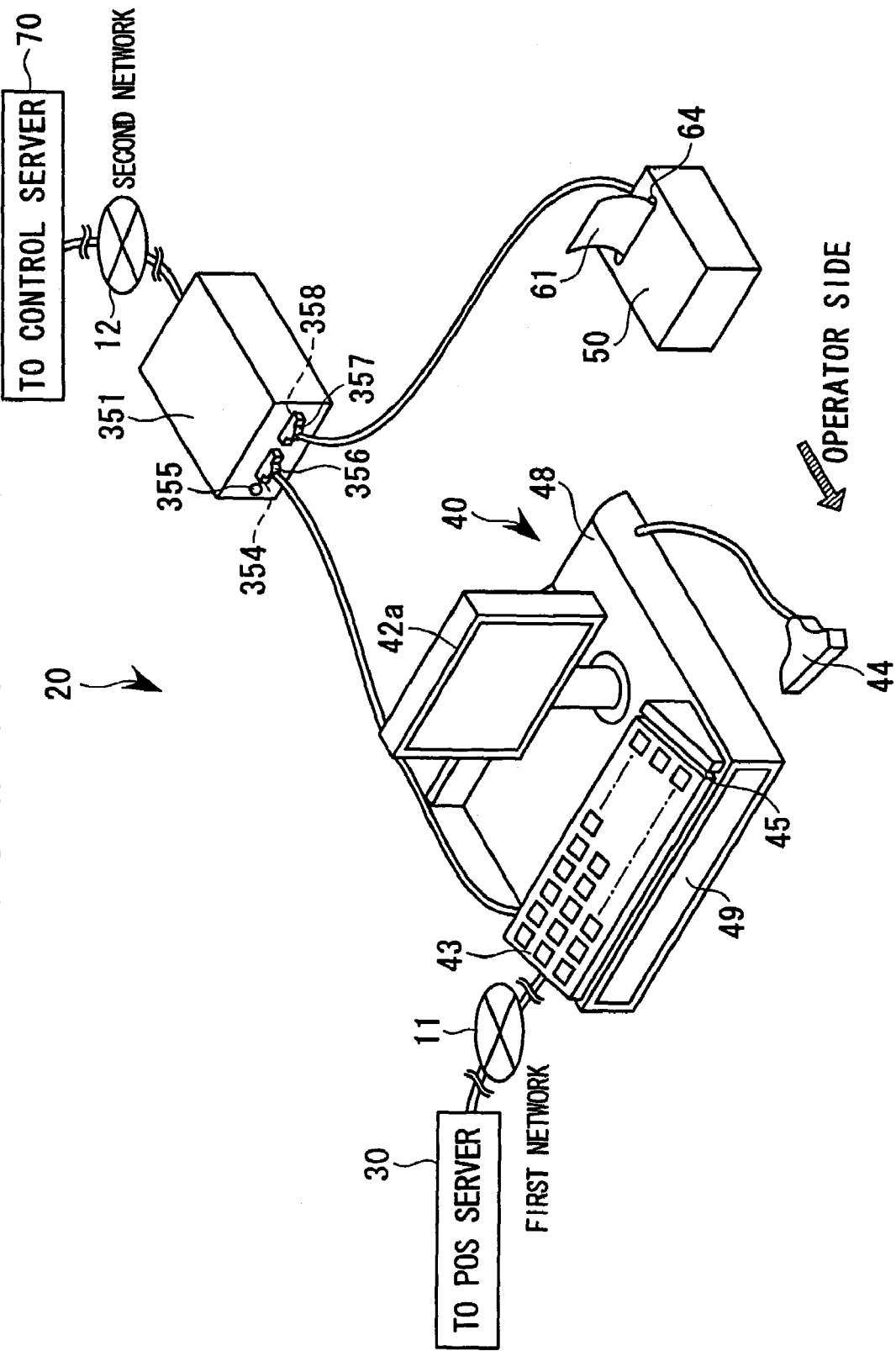
FIG. 11 is an external perspective view, as seen from the operator side, of a POS terminal according to the third embodiment of this invention.
Figure 12:
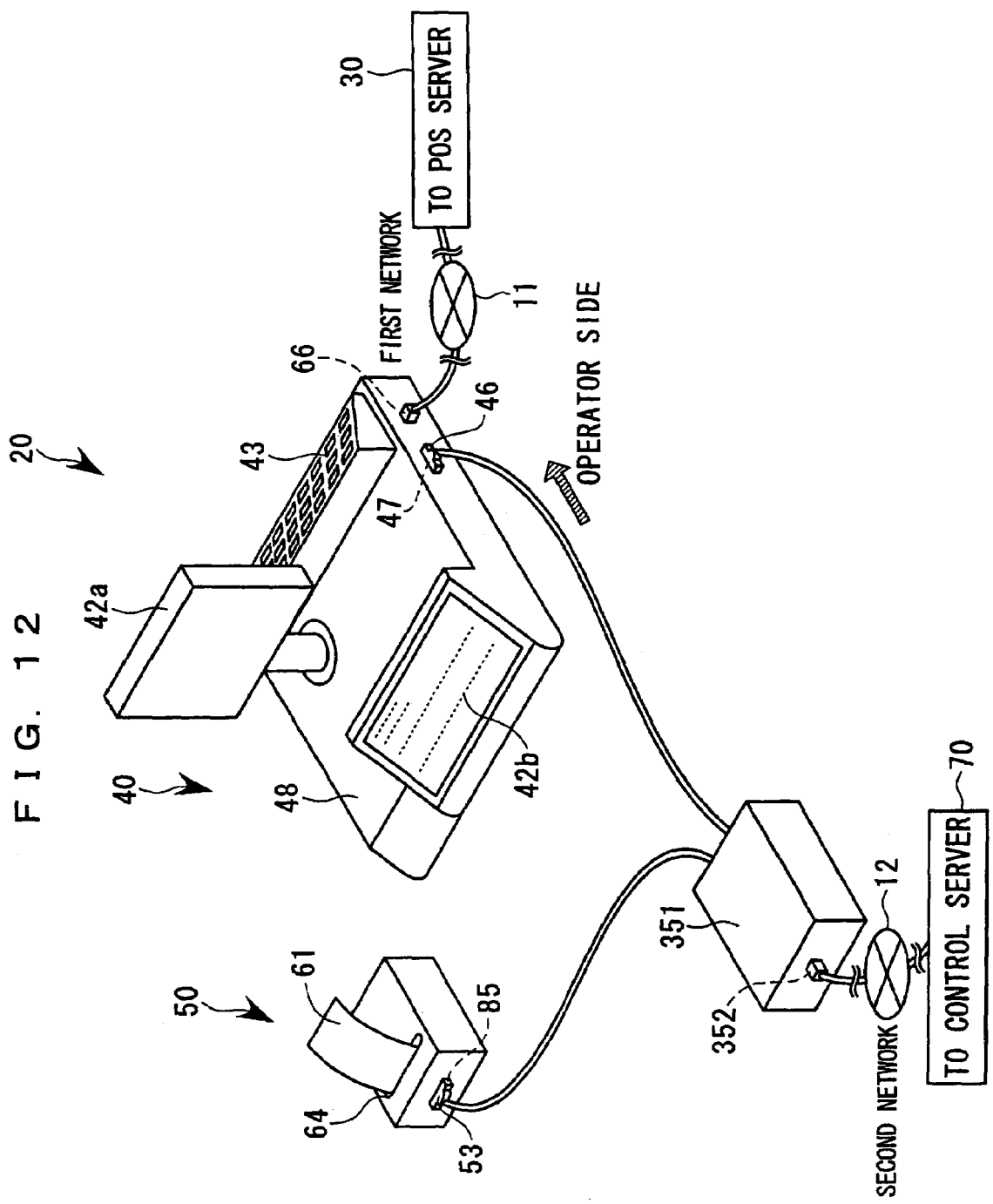
FIG. 12 is an external perspective view, as seen from the customer side, of a POS terminal according to the third embodiment of this invention.

Next, a description will now be made about the arrangement of the adapter device 351 with reference to FIGS. 11 and 12. FIG. 11 is a front perspective view of the POS terminal 20 as seen from the side of operation by the operator, and FIG. 12 is a rear perspective view of the POS terminal 20 as seen from the customer side. As shown therein, the POS terminal 20 is made up of: the terminal apparatus 40 whose main part is constituted by the main-body case 48; the adapter device 351 which is connected to the terminal apparatus 40 by a cable and is connected to the control server 70 through the second network 12; and the printing apparatus 50 which is connected to the adapter device 351 by a cable.

Aside from the keyboard 43, the display 42a, 42b and the bar code reader, the terminal apparatus 40 is provided on the left side surface of the main-body case 48 with an interface section 47 for connection to the adapter device 351, and an interface section 66 for connection to the POS server 30 through the first network 11. The printing apparatus 50 is further provided on the rear side thereof with a printer-side interface section 85 which is connected to the printing apparatus 50 by a cable through the adapter device 351 and the connector 53.

The main-body case of the adapter device 351 is constituted into a box shape and is provided on the front side thereof with: an operation indicator lamp 355; an interface section 354 for the terminal apparatus; and an interface section 358 for the printing apparatus. The interface section 354 for the terminal apparatus is connected to the terminal apparatus 40 and the interface section 358 for the printing apparatus is connected to the printing apparatus 50 by cables through the connectors 356, 357, respectively. On the rear side of the adapter device 351 there is disposed an input/output port (interface section for the control server) 352, which is connected in the form of network to the control server 70 through the second network 12.

Figure 13:
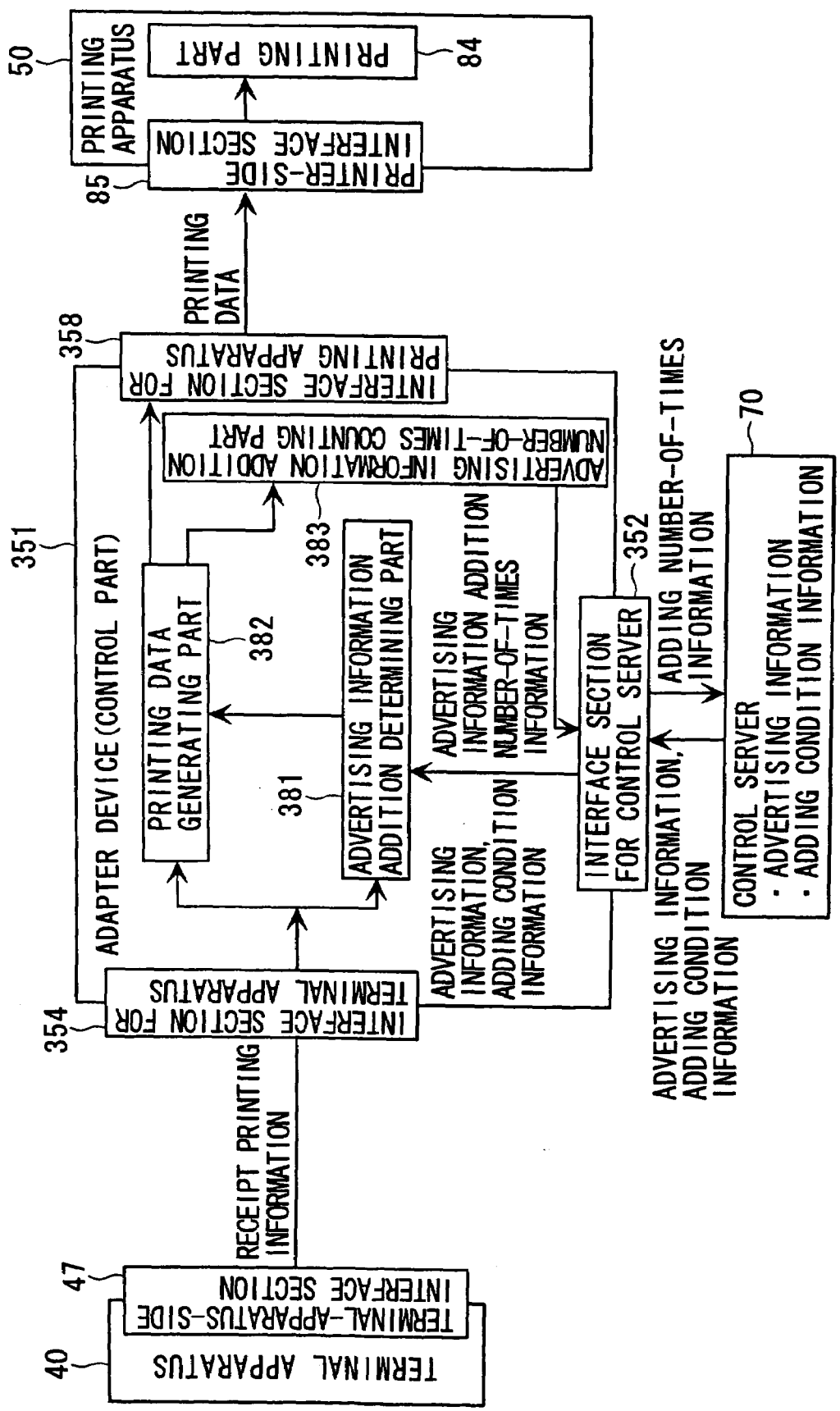
FIG. 13 is a block diagram showing the function of the adapter device according to the third embodiment of this invention.

A description will now be made about the arrangement of the adapter device 351 with reference to a function block diagram in FIG. 13. The control part 57 of the adapter device 351 is provided with the following: i.e., an "advertising information addition determining part 381" which reads out the advertising information and the adding condition information transmitted from the control server 70 and which, when receipt printing information that meets the adding condition information has been detected, determines to add the advertising information co-related with the adding condition information; a "printing data generating part 382" which generates the printing data by adding to the receipt printing information the advertising information that has been determined to be added by the advertising information addition determining part 381; and an "advertising information addition number-of-times counting part 383" which counts the number of times of adding the advertising information by the printing data generating part 382.

In the same manner as in the interface unit 51 in the first embodiment, the adapter device 351 has an arrangement in which the memory such as the CPU, the ROM, the RAM, or the like, is disposed inside the control part. Therefore, the description thereof is omitted. Description is also omitted about the respective processing in the "advertising information addition determining part 381," "printing data generating part 382," "advertising information addition number-of-times counting part 383" as well as the adding processing of the advertising information are the same as those in the first embodiment.

The "information about the number of times of adding the advertising information" which is the result of counting the number of adding times in the advertising information addition number-of-times counting part 383 is transmitted to the control server 70, and the number of times of addition can be obtained from the control server 70. Based on this number of times of addition, the advertising fee to be paid by the advertiser (manufacturer, or the like) is computed.

The adding condition information may be so arranged as to be stored in advance in the adapter device 351 instead of being provided from the control server 70. In this case, there may be provided inside the adapter device 351 a means for counting the number of times of issuing the receipts.

The information about the number of adding times is transmitted to the control server 70 and is stored from time to time so that the number of times of advertisement addition can be obtained from the control server 70. Therefore, as a result of access by the advertising agency, or the like, to this control server 70, the number of times of addition of the advertising information can be obtained and, based on it, the royalty (fee for using the advertising medium, or the like) can be computed. In this manner, by computing the royalty based on the number of times of addition of advertisement, a new advertising system can be established.

In the above-described embodiment, the terminal apparatus 40 and the printing apparatus 50 are connected to the adapter device 351 through the connectors 46, 53, respectively. However, though not illustrated, an arrangement may be made that the connection is wirelessly made. According to this arrangement, the freedom of laying out the printing apparatus 50 and the adapter device 35 is improved, and the ease of operation is not prevented by the cables, or the like.

A description will now be made about the POS system (network system) according to a fourth embodiment of this invention with reference to FIGS. 14 through 16. In this embodiment, a description is made about the network system in which a Web server is added to the POS system as described in the third embodiment. The network system 1 of this embodiment can efficiently provide the plural control servers 70 with the advertising information and the adding condition information. Point service can also be provided to the customer 60.

Figure 14:
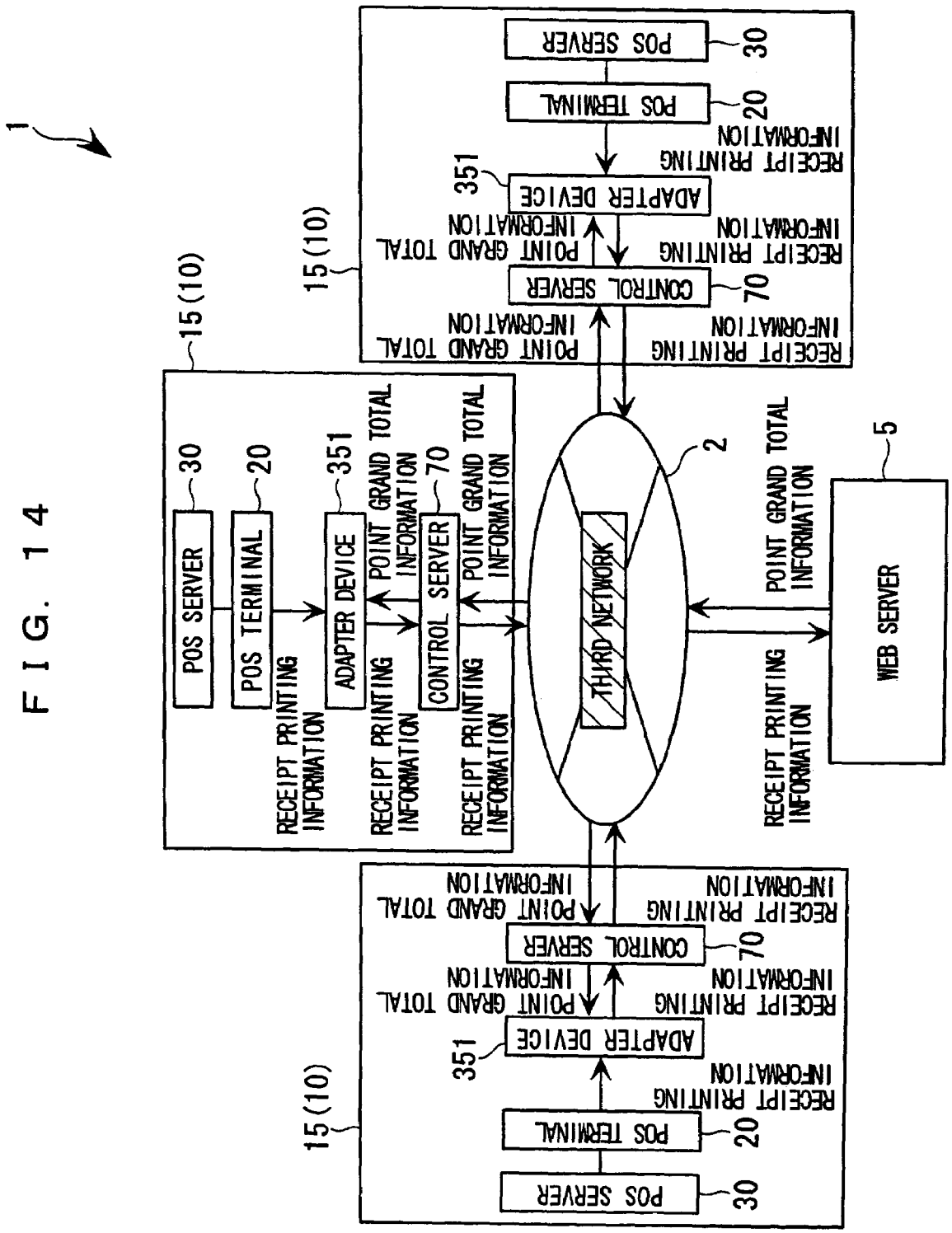
FIG. 14 is a schematic diagram showing an example of a network system according to the fourth embodiment of this invention.

As shown in FIG. 14, the network system 1 of this invention is made up of: a POS system 10 having a POS terminal 20, a POS server 30 which controls the POS terminal 20, a control server 70 which provides the POS terminal 20 with the advertising information and which obtains the input information from the POS terminal 20, and an adapter device 351 which is connected to the POS terminal 20 and the control server and which generates the printing data based on the receipt printing information; and a Web server 5 which is connected to a plurality of POS systems 10 (only three are illustrated) through a network 2 (a third network), which provides the control server 70 with the advertising information, and which performs customer control over all of the control servers 70 based on the receipt printing information obtained by the control server 70.

Figure 15:
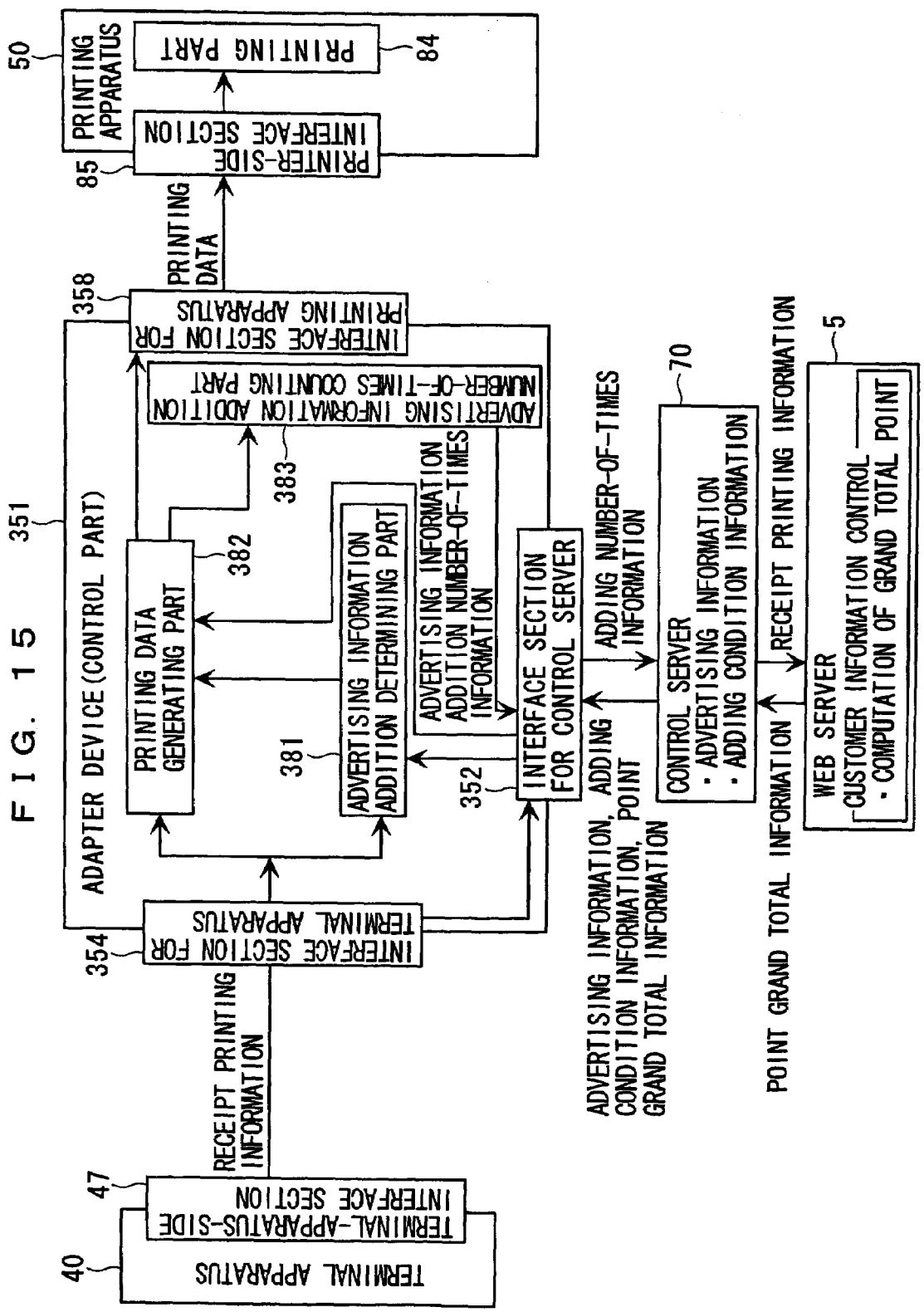
FIG. 15 is a block diagram showing the function of the network system according to the fourth embodiment of this invention.

As shown in FIG. 15, the customer control in the Web server 5 is performed based on the receipt printing information to be transmitted from the terminal apparatus 40 to the adapter device 351. It is now described in sequence. The receipt printing information obtained by the adapter device 351 through an interface section 354 for the terminal apparatus is subjected to a judgment at an advertising information addition determining part 381 as to whether the receipt printing information shall be added or not. The receipt printing information is also used to generate the printing data at a printing data generating part 382. The receipt printing information is further transmitted to the Web server 5 through an interface section 352 for the control server and the control server 70. The Web server 5 computes, e.g., the grand total of the points to be given to the individual customer 60 based on the customer information and the commodity information contained in this receipt printing information.

As a method of computing the grand total of points, it is possible to give points depending on the purchased amount, purchased items, purchased date, number of times of purchasing, or the like. When the point has reached a predetermined point, a bonus point may be additionally given as a part of variations in the method of computing.

The information about the grand total of the points as computed by the Web server 5 is transmitted to the adapter device 351 through the control server 70 and the interface section 352 for the control server. The information about the grand total of the points is printed on the receipt 61 at a printing part 84, whereby the grand total of the points can be presented to the customer 60 (see FIG. 16).

By presenting the grand total of the points as described above, the customer can avail himself/herself of the merits in the following manner. Namely, once the customer has collected, e.g., 1000 points, he/she is entitled to obtain a merchandise coupon that can be used for purchasing commodities equivalent to an amount of 1000 yen. In this manner, the customer 60 will be motivated to purchase the commodities to attain a target of 1000 points while confirming the present number of points, whereby the customer's motivation for purchasing can be accelerated.

The grand total of the points may rely on any of the systems presently in service. For example, a system which is put in service on a shop-by-shop basis, a system which is commonly utilized by a plurality of shops 15 (i.e., a so-called common-point service), or the like, may serve the purpose. Instead of presenting the grand total of points each time of purchasing, the following system may also be employed. Namely, the point granted depending on the amount of purchasing is printed on the receipt 61, this point is collected by the customer 60, and the collected receipts 61 are presented to the shop so that the customer 60 can enjoy the services offered in return for the points.

Figure 16:
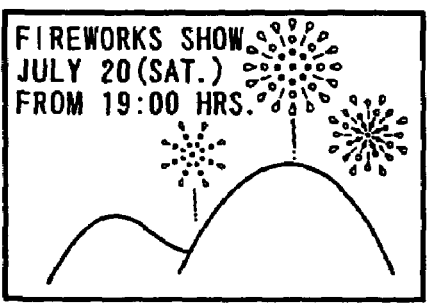
FIG. 16 is an example of a receipt to be issued by the network system, with an advertising added thereto.

Instead of printing the number of points each time of purchasing as shown in FIG. 16, an alternative system may be employed in which, only when the grand total of the points has reached a predetermined number of points, a coupon is printed so that the customer 60 can enjoy the services equivalent to the number of points. In this system, when the computed grand total of the points has reached, e.g., 100 points, this figure is printed on the receipt so that the customer 60 can use the printed receipt as a coupon for purchasing commodities equivalent to 100 yen.

The advertising information and the adding condition information are arranged to be provided from the control server 70 so that only the information about the grand total of the points is provided by the Web server 5 (see FIG. 14). Alternatively, all pieces of information (advertising information, adding condition information, and information about the grand total of points) are provided by the Web server 5. According to this arrangement, it is possible to transmit the same advertising information and the adding condition information to a plurality of control servers 70. Therefore, the Web server 5 can offer the advertising information and the adding condition information efficiently. In addition, by offering the common customer control (point service) for each of the tie-up groups, the common point service can be offered within the same tie-up group.

Still furthermore, the following arrangement may also be made. Namely, an advertising information addition determining part 381, a printing data generating part 382, and an advertising information addition number-of-times counting part 383 are all disposed inside the Web server 5. The printing data are generated based on the receipt printing information transmitted through the adapter device 351, and this printing data are transmitted to the adapter device 351 so that the printing apparatus 50 can be provided with the printing data. In other words, in this arrangement, the adapter device 351 is provided only with an interface section 354 for the terminal apparatus, an interface section 358 for the printing apparatus, and the interface section 352 for the control server. Alternatively, the arrangement may be made that the control server 70 is similarly provided with the advertising information addition determining part 381, the printing data generating part 382, and the advertising information addition number-of-times counting part 383. According to this arrangement, the construction of the adapter device 351 can be simplified, so that the adapter device 351 can be offered to each of the shops 15 at a low price.

The Web server 5 may also be arranged to perform, aside from the computation of the grand total of the points, the customer control based on the customer information and commodity information contained in the receipt printing information, such as the preparation of the customer list, the preparation of the commodity purchase list by each of the customers 60, or the like.

According to this embodiment, it is possible to perform the following jobs without largely modifying the exiting POS servers 30 and the terminal apparatuses 40. The jobs in question are to compute by the Web server 5 the grand total of the points to individual customer 60 and to offer services pertinent to the points. In other word, it is possible to establish at a minimum amount of investment the network system that can perform the efficient customer information control and the advertising information control.

In the third and fourth embodiments, the arrangement is that the advertising information and the adding condition information are provided from the control server 70 to the adapter device 351. Alternatively, it may also be so arranged that these pieces of information are stored in the memory card 152 for mounting on the adapter device 351, whereby the advertising information and the adding condition information can be presented from the memory card 152.

In the adapter device 351 in this alternative arrangement, the adapter device 351 is provided with a mounting slot into which and out of which the memory card 152 can be mounted and detached, respectively. By mounting the memory card 152 into this slot the advertising information and the adding condition information can be obtained. The advertising information addition determining part 381 determines to add the advertising information when the receipt printing information meets the adding condition information and, based on the result, the printing data are generated in the printing data generating part 382.

The information about the number of times of adding the advertising information as counted by the advertising information addition number-of-times counting part 383 is stored in the memory card 152. The advertising addition information can thus be obtained from the used memory card 152 and, based thereon, it becomes possible for the shop 15 to receive from the advertiser the royalty (fee for using the advertising medium, or the like). For the advertising system (distribution/collecting system 100 of the memory cards) using the memory card 152, the embodiment as explained in the first embodiment (see FIG. 8) can be used and, therefore, its explanation is omitted. According to this arrangement, since the advertising information is stored in the memory card 152 which is detachably mounted on the adapter device 351, the advertising information can be easily replaced by replacing it. In addition, by offering the advertising information by using the memory card 152, the distribution and collection thereof can be easily performed.

As described hereinabove, according to the POS system 10 and the interface unit 51 in the first and second embodiments, by inserting the memory card 52 into the interface unit 51 mounted on the board slot 59 of the printing apparatus 50, the advertising information is read out. The advertising information is then added to the receipt printing information obtained from the terminal apparatus. Therefore, without carrying out large-scale modification to the existing POS server 30 and the terminal apparatus 40, there can be established a POS system 10 in which the advertising information can be added. In addition, since the advertising information is stored in the memory card 52, the advertising information can be easily changed by replacing the memory card 52. As a result, it is possible to provide the customer 60 with the timely advertisement.

Furthermore, since the condition (adding condition information) for adding the advertising information is also stored in the memory card 52, the addition of the advertising information can be limited by setting various conditions. As a result, the contents of the advertisement and the method of advertising can be diversified. Further, since the advertising information and the adding condition information are stored in the memory card 52 and can be offered at the same time, waste of time can be prevented.

Furthermore, since the number of times of adding the advertising information is counted and the information is stored in the memory cars 52, the number of times of addition can be obtained from the used memory card 52 and, based thereon, the advertising fee, royalty, and the fee for using the advertising medium can be computed. As a result, a new advertising system can be established.

According to the POS system 10, adapter device 351, and the network system 1 according to the third and fourth embodiments, the printing data are generated by adding the advertising information to the receipt printing information as obtained from the terminal apparatus 40 inside the adapter device 351 as a result of connecting the adapter device 351 to the printing apparatus. Therefore, without modifying at all the exiting POS server 30 and the POS terminal 20, there can be established a POS system in which the advertising information can be added.

Still furthermore, since the advertising information is provided from the control server 70 which is connected to a plurality of POS terminals 20, the control server 70 can control in a lump over the plurality POS terminals. On the other hand, since the POS terminal 20 can timely obtain the advertising information. As a result, easy handling can be made of the advertisement whose advertising period is limited.

In addition, since the control server 70 also provides the condition under which the advertising is added (advertising adding condition), the addition of the advertising information can also be restricted. As a result, the contents of the advertisement and the method of advertising can be diversified. Since the advertising information and the adding condition information can be offered simultaneously, it is possible for the control server 70 to save extra time.

Still furthermore, since the number of times of adding the advertising information is counted and the information is stored in the control server 70, it is possible to obtain from the control server 70 the number of times of adding and, based on it, to compute the advertising fee and the royalty. As a result, a new advertising system can be established.

In the above-described embodiments, the receipt printing information is obtained from the interface unit 51 or the adapter device 351 and, based on it, a determination is made as to whether the advertising information shall be added or not. It may be so arranged that the input information (commodity information and input information) inputted by the operator is directly obtained and, based on it, a determination is made as to whether the advertising information shall be added or not. According to this arrangement, a determination as to whether the advertising information shall be added or not can be made by an input of a relatively simple data construction such as reading with a bar code reader, reading with a card reader, or the like. Therefore, as compared with the case in which the determination is made based on the receipt printing information of relatively complicated data construction, a determination can be made easily as to whether the advertising information shall be added or not. Further, in case the commodity information and the customer information can be simultaneously obtained by means of a bar code reader, or the like, the reading out of the customer information can be made easily as compared with the case in which the customer information is extracted from the receipt printing information.

In the above-described embodiments, examples are used in which the memory card 52 is used as the memory medium. Aside from the memory card, there can be used a compact disc, optical disc, digital versatile disc, flexible disc, or the like. As the memory card, it is preferable to use exiting memory cards such as a compact flash (registered trademark), smart medium, memory stick, or the like.

It is possible to modify the system arrangement, apparatus arrangement, or the like, without departing from the scope of this invention.

As described above, according to the POS system, the network system, the method of generating printing data for a POS system, and the method of managing sales and advertisement information in the network system of this invention, there can be established a POS system that can add the advertising information without largely modifying the existing POS server and the terminal apparatuses.

What is claimed is:

1. A network system comprising:
    first means for generating, in a local controller, first information to be printed;

second means for receiving, from a central system controller, second information to be printed;

printing means for printing at least one of said first information and said second information; and an apparatus mounted to said printing means, said apparatus having an interface unit connected to at least one of said local controller and said central system controller, and having a slot for receiving a memory device storing third information for comparison with at least one of said first information and said second information;

wherein said first information and said second information are transmitted through said interface unit of said apparatus.

2. The network system according to claim 1, wherein said interface unit is mounted to said printing means.

3. The network system according to claim 1, wherein said first information is cash equivalent information, and said second information is non-cash equivalent information.

4. A network system comprising:
   a terminal apparatus for inputting cash equivalent information to be printed;
   a control server for providing non-cash equivalent information to be printed;
   a printer for printing at least one of said cash equivalent information and said non-cash equivalent information on an object to be printed; and
   an adapter unit mounted to said printer, said adapter unit having an interface unit connected to said terminal apparatus and an input/output port connected to said control server;
   wherein said cash equivalent information is transmitted through said interface unit and said non-cash equivalent information is transmitted through said input/output port.

5. The network system according to claim 4, wherein said interface unit is mounted in a board slot of said printer.

6. A method of managing a network system comprising:
   generating, in a local controller, first information to be printed;
   receiving, from a central system controller, second information to be printed;
   transmitting said first information and said second information through an additional apparatus;
   receiving third information from a memory device attached to said additional apparatus;
   comparing at least one of said first information and said second information with said third information; and
   printing at least one of said first information and said second information on an object to be printed based on said comparing.

7. A method of managing a network system, said network system comprising a terminal apparatus, a control server, a printer, and an adapter unit mounted to said printer, said adapter unit having an interface unit and an input/output port, said method comprising:
   inputting cash equivalent information at said terminal apparatus;
   receiving non-cash equivalent information from said control server;
   transmitting said cash equivalent information to said printer through said interface unit;
   transmitting said non-cash equivalent information to said printer through said input/output terminal; and
   printing at least one of said cash equivalent information and said non-cash equivalent information by said printer.

* * * * *